May 12, 1959

T. FOSTER 2,885,899

PRESELECTIVE SPEED CHANGER

Filed Oct. 28, 1957

INVENTOR.
Theodore Foster
BY
O. B. ...
Atty.

May 12, 1959

T. FOSTER 2,885,899

PRESELECTIVE SPEED CHANGER

Filed Oct. 28, 1957

INVENTOR.
Theodore Foster
BY
Colin O.B. Garner
Atty

May 12, 1959    T. FOSTER    2,885,899
PRESELECTIVE SPEED CHANGER
Filed Oct. 28, 1957    11 Sheets-Sheet 3
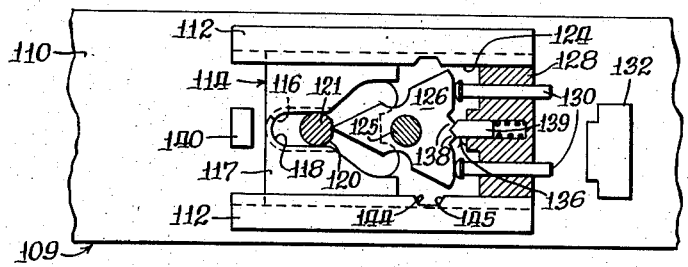
Fig. 5.
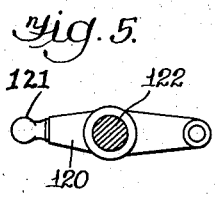
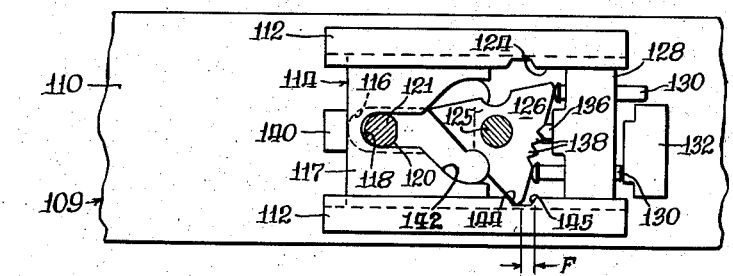
Fig. 6.
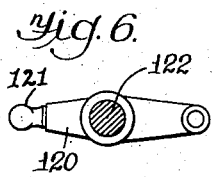
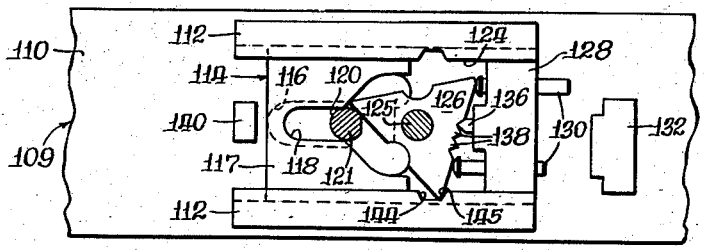
Fig. 7.
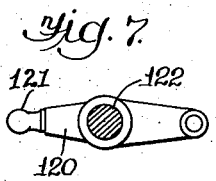
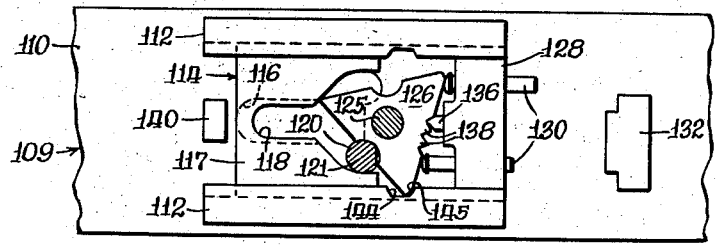
Fig. 8.
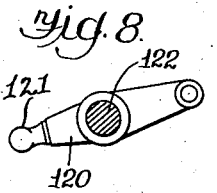
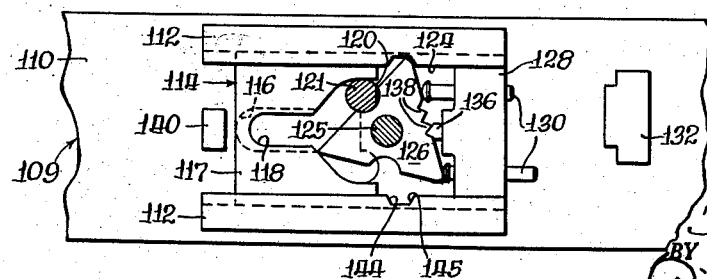
Fig. 9.
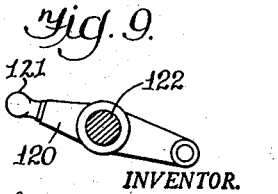
INVENTOR.
Theodore Foster
BY
Wim O. B. Garner
Atty.

May 12, 1959 T. FOSTER 2,885,899
PRESELECTIVE SPEED CHANGER
Filed Oct. 28, 1957 11 Sheets-Sheet 4
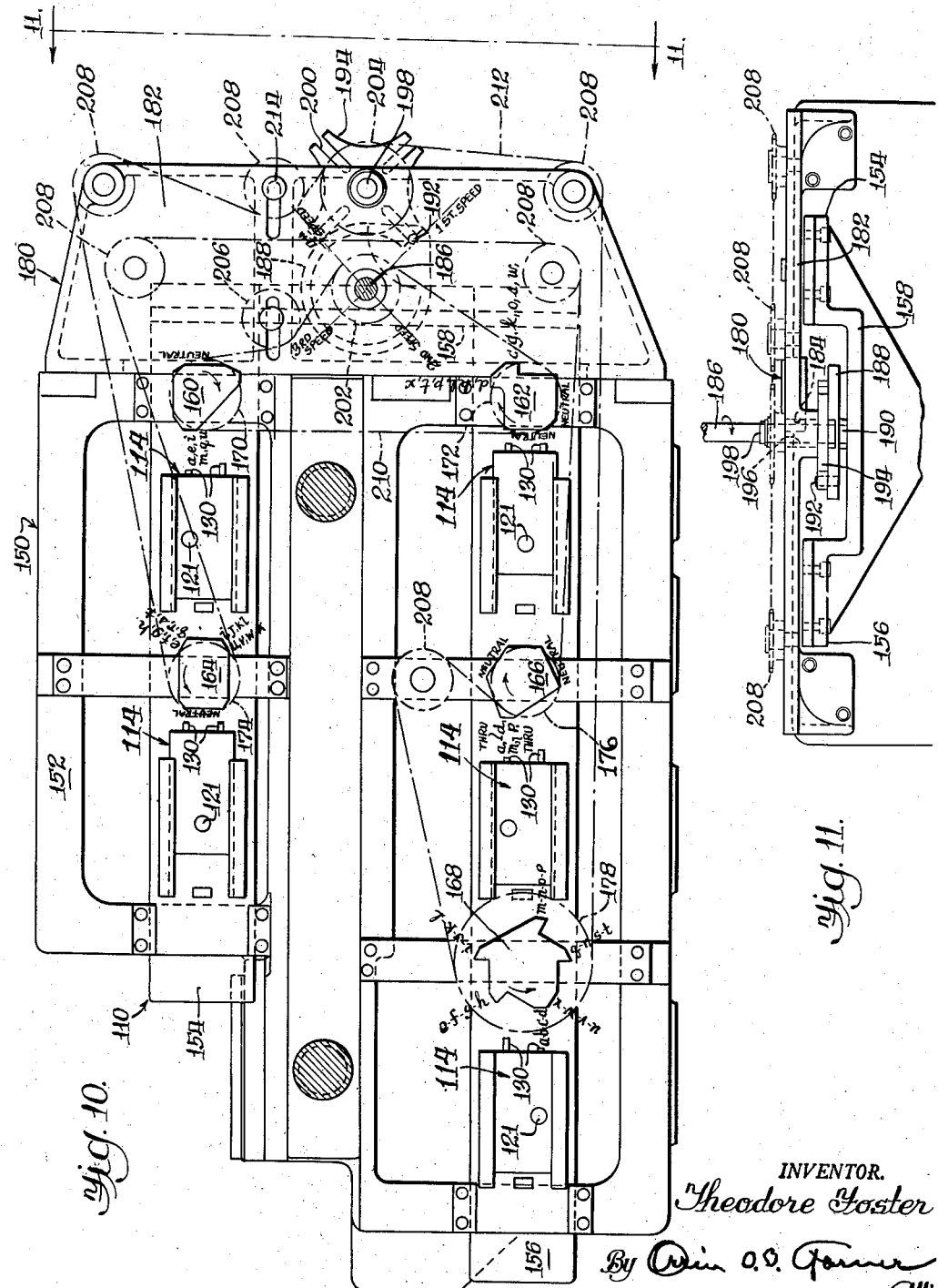
INVENTOR.
Theodore Foster

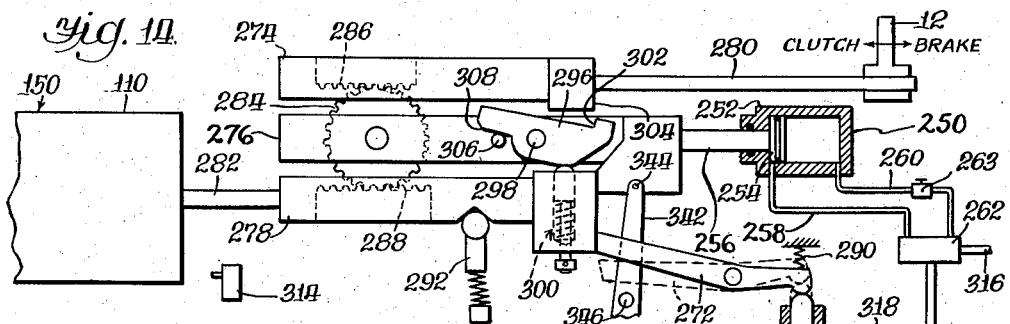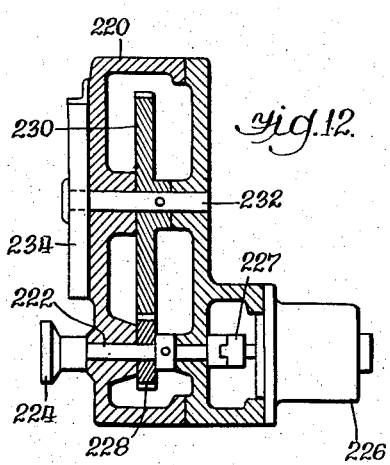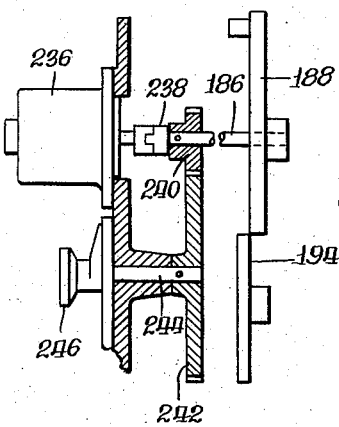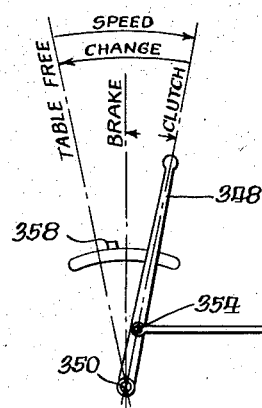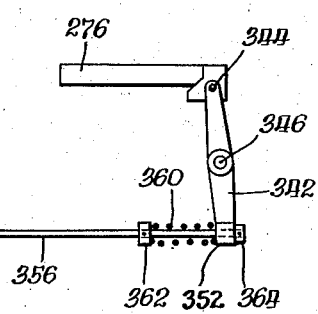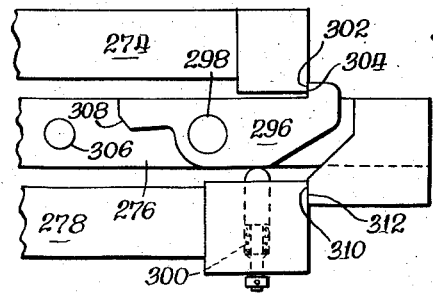

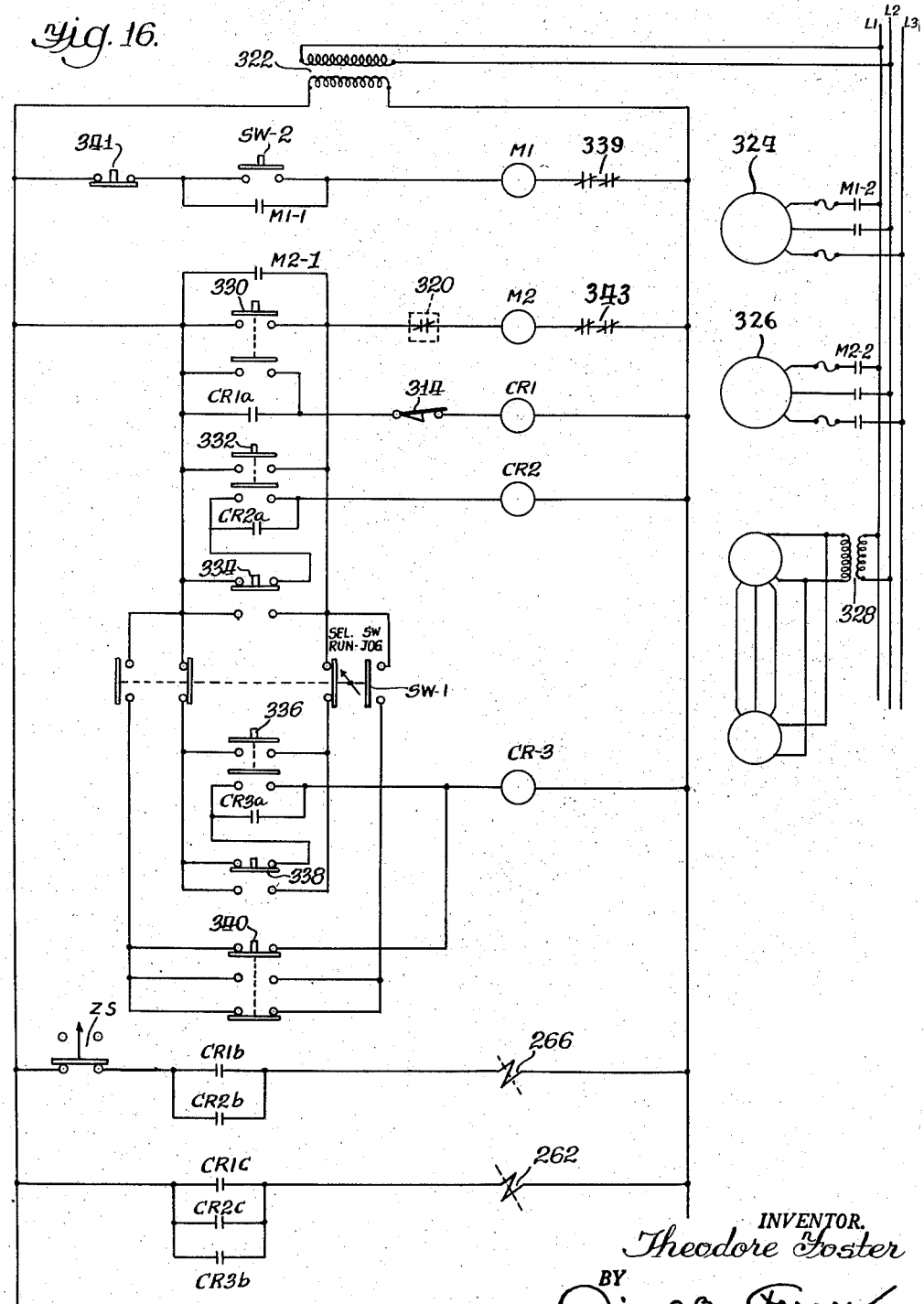

May 12, 1959            T. FOSTER            2,885,899
PRESELECTIVE SPEED CHANGER
Filed Oct. 28, 1957            11 Sheets-Sheet 7
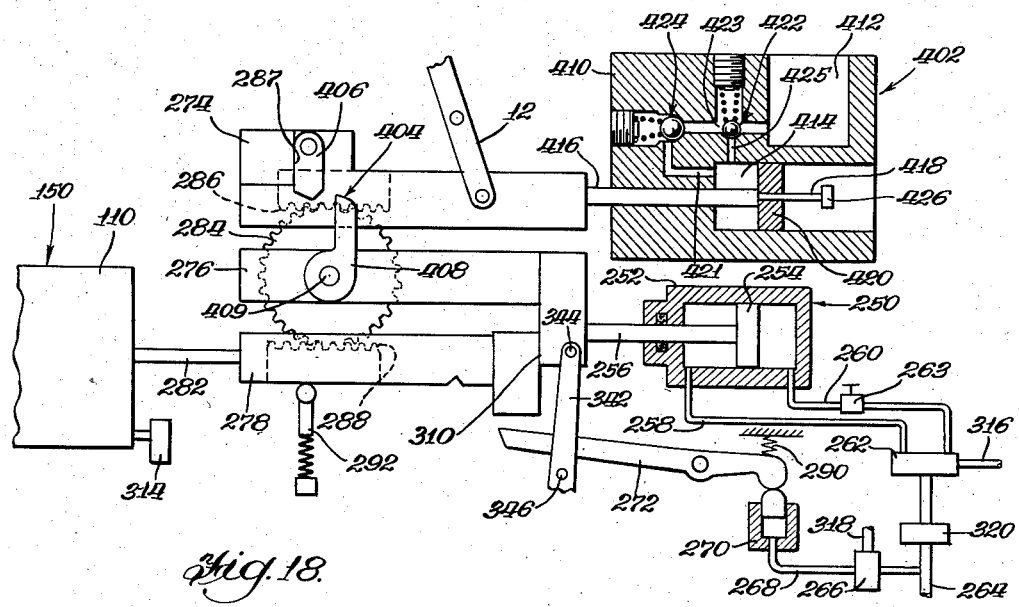
Fig. 18.
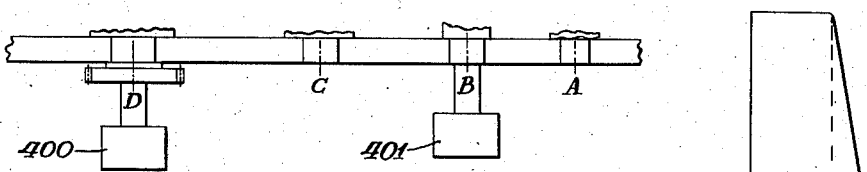
Fig. 17a
Fig. 22.
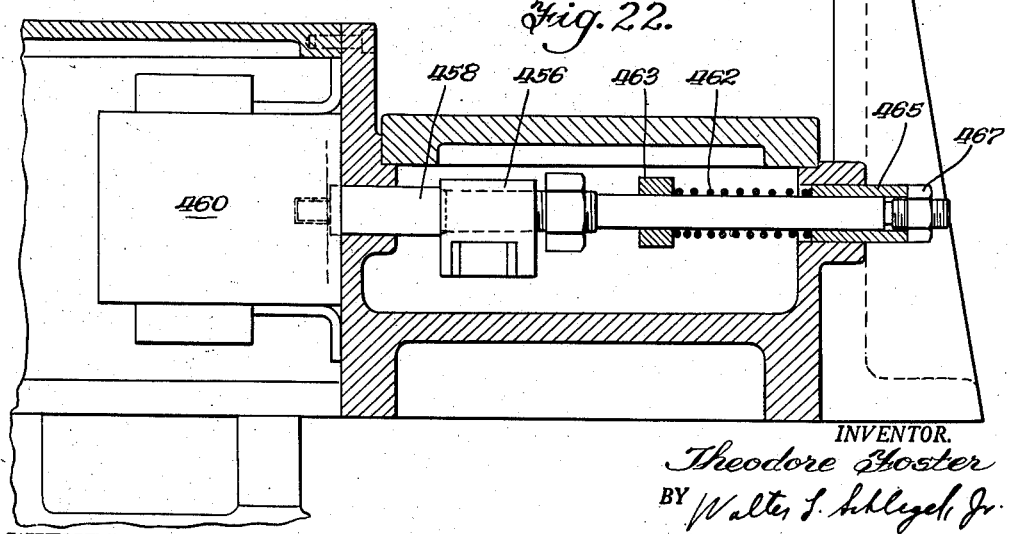
INVENTOR.
Theodore Foster
BY Walter L. Schlegel, Jr.
Atty.
WITNESS.
Ralph M...

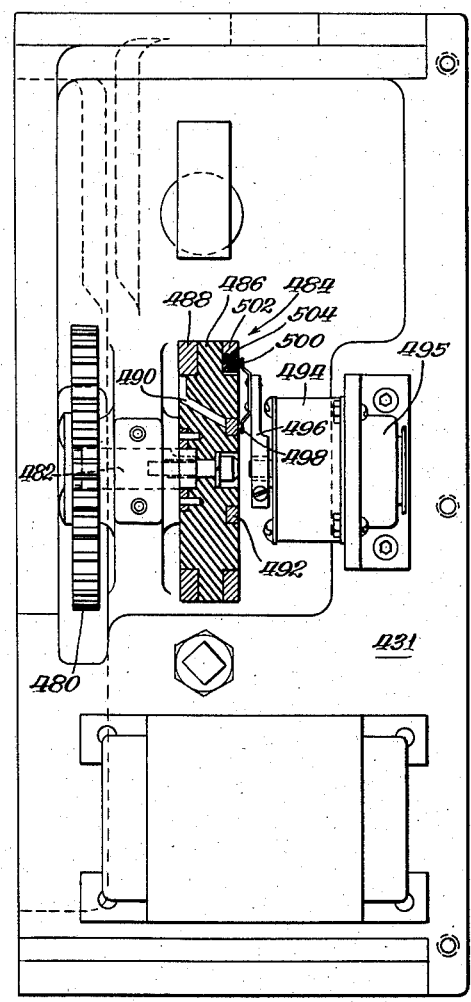
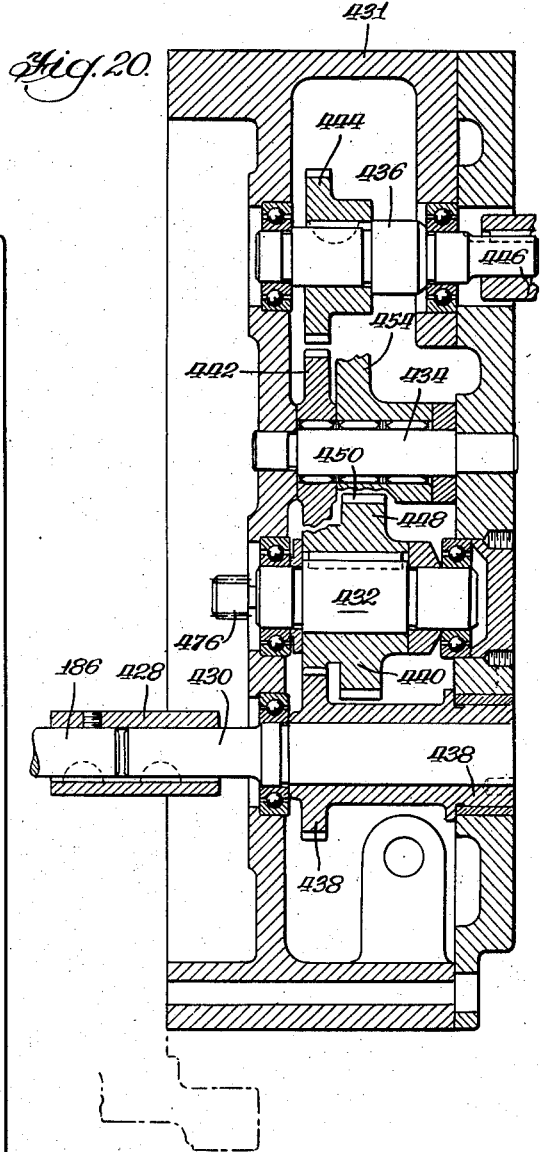

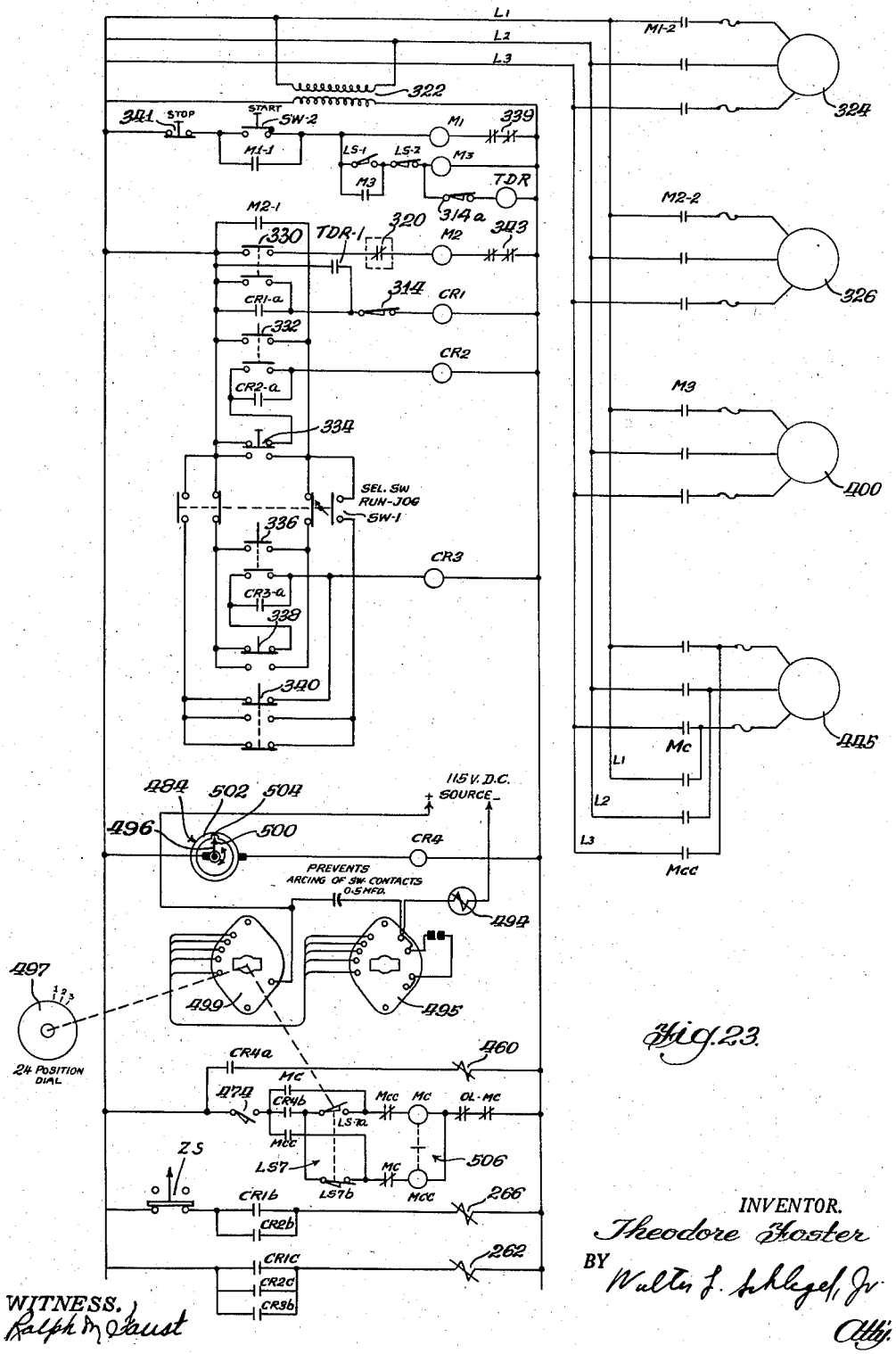

May 12, 1959 T. FOSTER 2,885,899
PRESELECTIVE SPEED CHANGER
Filed Oct. 28, 1957 11 Sheets-Sheet 11

INVENTOR.
Theodore Foster
BY Walter L. Schlegel, Jr.
Atty.

Witness:
Ralph M. Faust

United States Patent Office 2,885,899
Patented May 12, 1959

2,885,899

PRESELECTIVE SPEED CHANGER

Theodore Foster, Cincinnati, Ohio, assignor to American Steel Foundries, Chicago, Ill., a corporation of New Jersey Application October 28, 1957, Serial No. 692,981

27 Claims. (Cl. 74—359)

My invention relates to metal turning and boring machines and more particularly to a novel preselective speed changer associated therewith, and is a continuation-in-part of my application bearing Serial No. 589,537, now abandoned filed June 5, 1956.

My invention comprehends a novel preselective arrangement whereby the speed of a rotating work holding table of said machine may be incrementally varied through a wide range. As well understood by those skilled in the art, versatility of available turning speeds is highly desirable both from a piece part production time and production quality standpoint. Existing machines are generally of two types, that is, the constant speed machine and the variable speed machine. Constant speed machines generally offer 16 stepped speed changes in a geometric progression. These various speeds are obtained by selective combinations of four mechanical changes on a complemental initial drive, whereby 16 distinct ratios of the gear train are produced. The mechanical changes are usually attained through the use of internal-external tooth clutch arrangements, or in some few instances through sliding gear arrangements. The variable speed machines are still more versatile in that mechanical speed changes are either eliminated entirely or reduced to four on the main drive only. A wide range of table speeds is afforded through field rheostat control of a direct current operating motor which acts as a power source for said machine. While the variable speed machines are the most versatile in that they afford a wide range of speeds in very small increments, they suffer from the practical disadvantage of cost in that they require an expensive direct current power source usually not available in most factories. Consequently, costly and often complicated motor-generator arrangements are a necessary adjunct to the variable speed machines. For this reason, it is desirable to provide constant speed machines with as wide a speed variation as is reasonably possible considering all factors.

With the above in mind, it is a general object of my invention to provide a constant speed machine with its consequent cost advantages, yet more versatile than such type machines heretofore existing.

It is another object of my invention to provide a novel method of obtaining, by mechanical selection, a wide range of machine speeds.

It is a specific object of my invention to provide a novel mechanical shifter arrangement to select and maintain variable machine speeds.

It is another specific object of my invention to provide a novel shifter arrangement to select and maintain variable machine speeds that can be applied to any machine of the type described regardless of transmission size, and, in conjunction with the shifter arrangement, to provide means for making each gear shift operation responsive to speed of table rotation, and to provide additional means for automatically re-shifting if the gears do not properly mesh.

Still another specific object of my invention is to provide a constant speed machine which affords twenty-four table speeds stepped in a geometric progression.

It is a different object of my invention to provide novel automatic hydraulic and electrical energizing and control circuits for my variable speed arrangement.

Another object of my invention is to provide a manual control for my variable speed arrangement.

These and other objects of my invention will become apparent in the course of the following description and from an examination of the concerned drawings, wherein:

Figures 5 through 9 are fragmentary detail views of a position selector device employed in my invention;

Figure 10 is a fragmentary plan view of an operating panel employed in my invention;

Figure 11 is a fragmentary view taken along line 11—11 of Figure 10;

Figure 12 is a fragmentary sectional view of the speed selector dial assembly utilized in my invention;

Figure 13 is a fragmentary sectional view illustrating an assembly designed to cooperate with the selector dial assembly shown in Figure 12;

Figure 14 is a diagrammatic fragmentary view of a control assembly employed in my invention in its return position;

Figure 15 is a fragmentary view of a portion of the assembly of Figure 14 in full advance position;

Figure 16 is a diagram of an electrical circuit employed in my invention;

Figure 17 is a diagrammatic view of a manual linkage utilized in the preferred embodiment;

Figure 1:
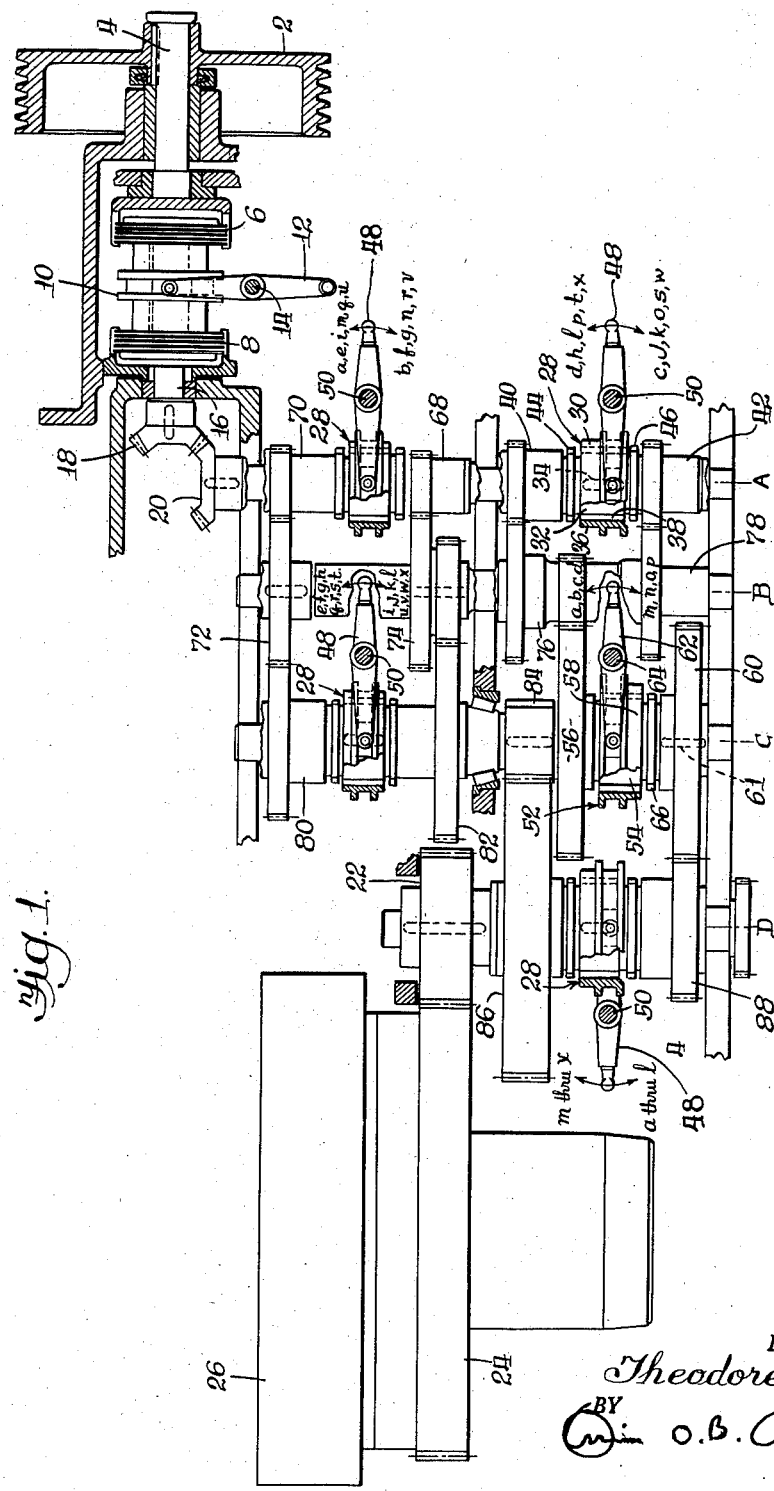
Figure 1 is a fragmentary partially diagrammatic side elevational view of a vertical boring mill transmission system embodying portions of my invention.
Figure 2:
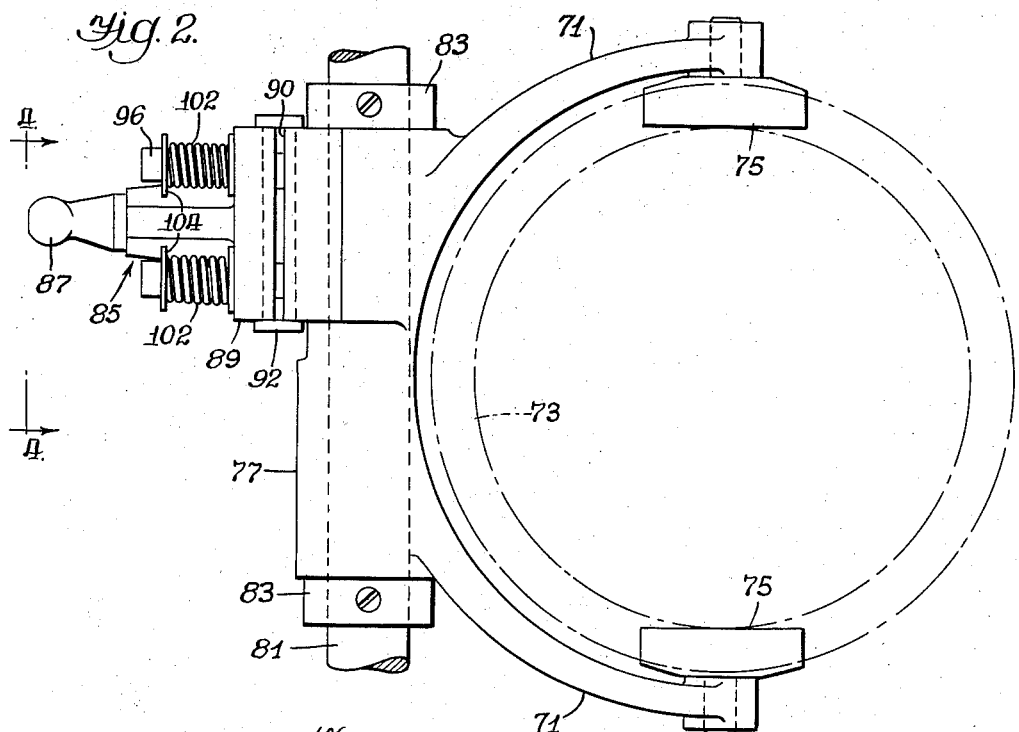
Figures 2, 3 and 4 are detailed views of a shifter fork utilized in the preferred embodiment of Figure 1, and being respectively a top plan view, side elevational view and an end view taken along line 4—4 of Figure 2.
Figure 3:
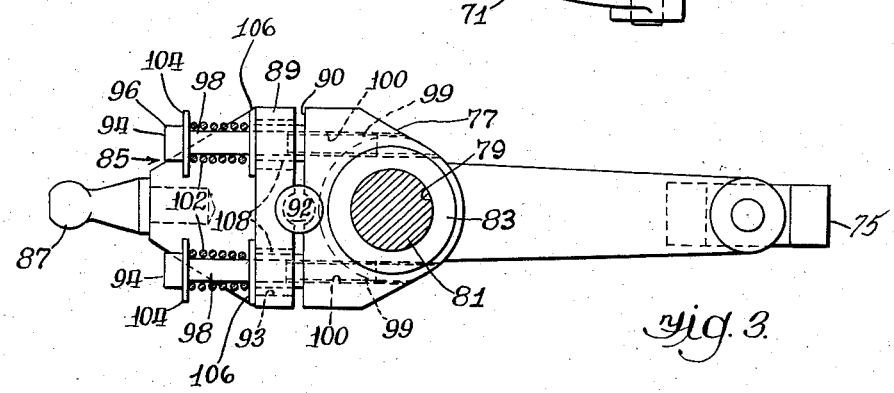
Figure 4:
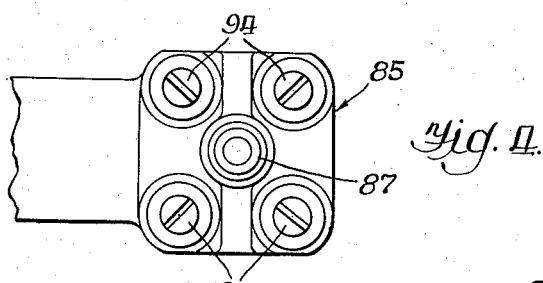
Figure 19:
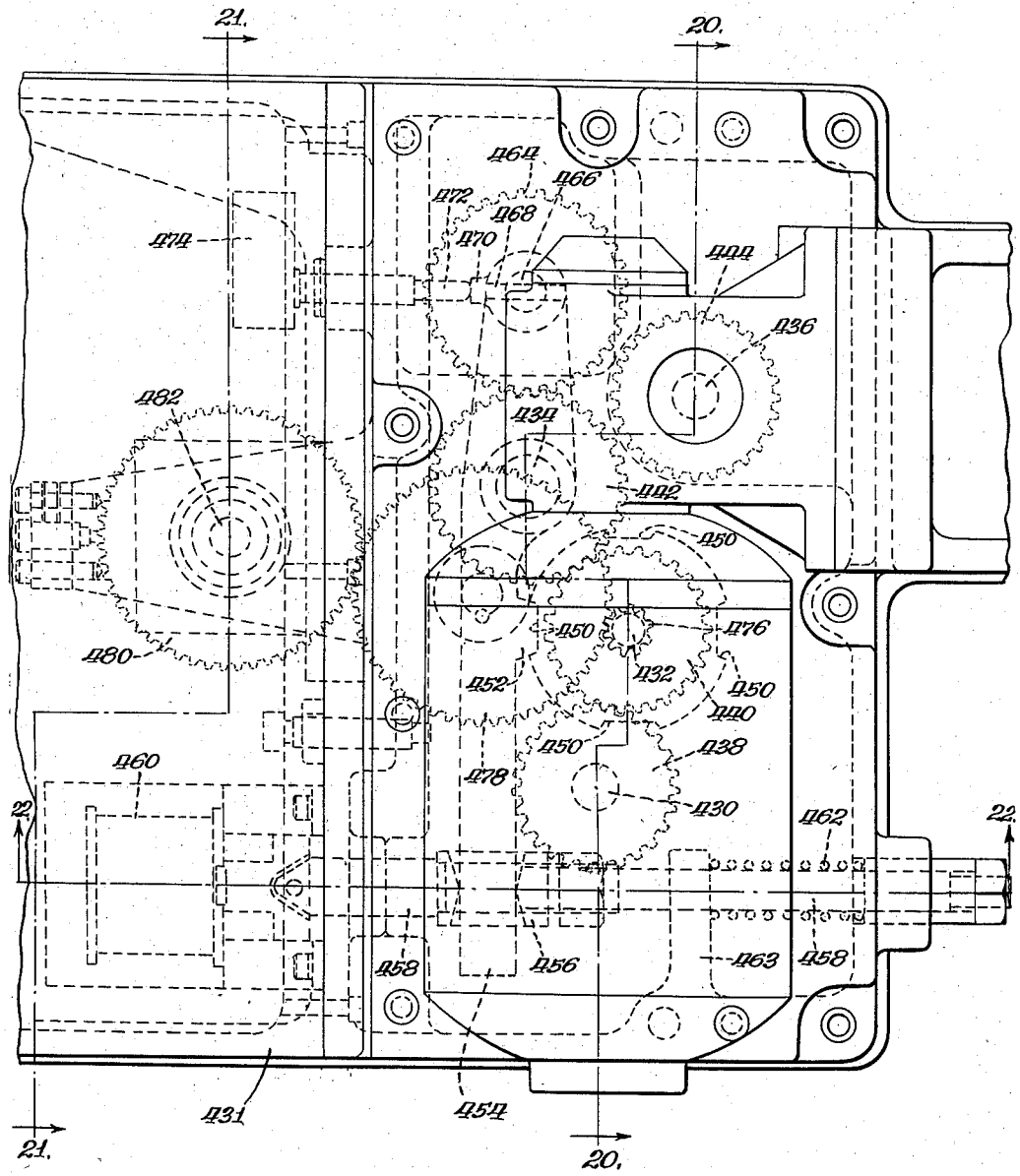
Figure 24:
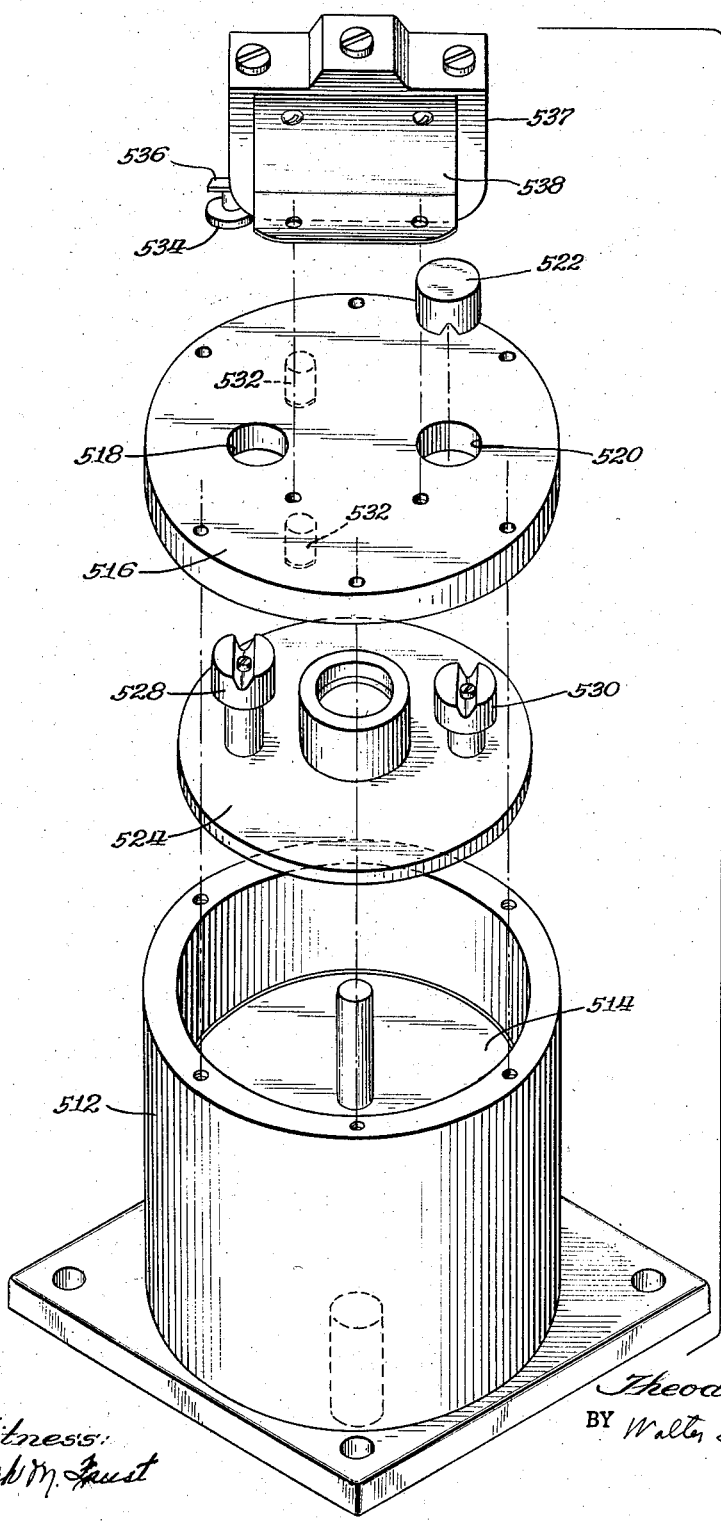

Figures 17A–23 illustrate a modification of the device shown in Figures 1–17, Figure 17A being a fragmentary view corresponding to Figure 1 showing a modified transmission system, Figure 18 corresponding to Figure 14 and showing a modified control assembly, Figure 19 being a front elevational view of a modified speed selector unit, Figures 20–22 being sectional views taken respectively on lines 20—20, 21—21 and 22—22 of Figure 19, and Figure 23 being a diagram showing a modified electrical actuating circuit for the selector unit of Figures 19–22;

Figure 24 is an expanded perspective view of a switch utilized in the control circuit.

*Transmission system*

Describing my invention in detail, attention is first directed to Figure 1 which illustrates the drive or transmission system employed in a vertical mill embodying my invention. The numeral 2 designates a conventional sheave designed for belt drive connection to a conventional electrical motor or other power source (not shown). During machine operation, sheave 2 is continuously rotating and because said sheave is keyed to the main shaft 4, said rotation is transmitted thereto.

Conventional multiple disk main clutch and brake assemblies are indicated at 6 and 8, respectively. Intermediate the clutch and brake, a movable sleeve 10 is positioned. A clutch actuating arm 12, shown in the neutral position, is pivoted to the machine frame as at 14 and operatively engages the sleeve 10, whereby upon clockwise movement of the arm 12 about its pivot, the clutch is engaged by the sleeve and rotation of shaft 4 is transmitted to drive shaft 16 and movement of the arm 12 counterclockwise about the pivot 14 urges the sleeve 10 to engage the brake 8, whereby rotation of the drive shaft 16 may be stopped.

Keyed to the inboard end of the drive shaft 16 is a gear 18, which in turn engages a bevel gear 20, the latter being keyed to the transmission shaft A of the transmission system.

The transmission system of the preferred embodiment consists of a plurality of transmission shafts, here designated A, B, C and D. It will be seen that the shaft D has keyed on one end thereof a table drive gear 22, which complementally engages a ring gear 24 in turn secured to the underside of the table 26. Thus it will be understood that motion of the power source (not shown) is carried through the transmission system to the pivotally mounted work carrying table 26, whereby table rotation is produced. The transmission system offers a plurality of selectible gear trains or gear train ratios, as hereinafter explained, and thus provides variable table rotative speeds.

As noted, the transmission system comprises a plurality of shafts A, B, C and D. On each shaft is positioned one or more positive tooth clutches, indicated generally at 28 and 52, of the external-internal tooth type. The clutches 28 are substantially identical in construction and operation, hence for purposes of explaining said operation, only clutch 30 on shaft A will be considered. Clutch 30 comprises a body 32 keyed to shaft A as at 34, hence rotatable therewith. Telescoped over the body 32 is a sleeve 36 which is in internal splined engagement with the body 32, as at 38, and is slidable on said body axially of the supporting shaft, in this case shaft A. The gears 40 and 42 have formed thereon, on sides adjacent the clutch 30, male clutch teeth 44 and 46, respectively, of such pitch and contour that they will complementally engage the female tooth formation of the clutch sleeve 36 as the latter is urged to move axially of the shaft A by either clockwise or counterclockwise motion of an associated clutch fork 48, which is pivoted to the frame as at 50. Thus movement of the sleeve 36 in either of said axial directions will cause the sleeve to engage one set of said female teeth with the related male teeth, whereby rotation of the shaft A will be carried through the body 32, the sleeve 36, and the engaged male member urging the related gear 40 or 42 to rotate. All clutches designated 28 operate in this manner. It will be noted, however, that the operation of clutch 52 is somewhat different. Here the clutch body 54 is fixedly secured to gear 56, which in turn freely rotates on shaft C. The clutch sleeve 58 is again in complemental internal splined engagement with the body 54 and the sleeve is slidable axially of the shaft C. It will be noted, however, that the gear 60 provides male clutch teeth 66 to engage the sleeve 58. Hence, the sleeve 58 is only movable into and out of engagement with the gear 60, which is keyed to shaft C, as at 61. It will be noted that in clutch 52, the associated clutch fork 62 is movable only in a counterclockwise direction to produce clutch engagement with the associated male gear whereby motion of the gear 56 is transmitted to shaft C through the gear 60.

In connection with the above clutch operation, it will be understood that gears 40, 42, 68 and 70 freely rotate about shaft A, that gears 72, 74, 76 and 78 are keyed to shaft B and rotate therewith, gears 80, 82 and 56 freely rotate about shaft C, while gears 84 and 60 are keyed to rotate with shaft C, and gears 86 and 88 freely rotate about shaft D, while gear 22 is keyed to and rotates with shaft D.

It will also be understood in connection with Figure 1, that for clarity of presentation, the clutch arms 48 and 62 have been rotated angularly into the plane of the drawing, rather than presenting complicated sectional views illustrating these arms in their normal position.

As noted in the objects above, my preferred embodiment offers twenty-four distinct table speeds. These speeds are accomplished by different gear ratios between the drive gear 20 and the table drive gear 22. The various gear ratios are determined by the particular gear train selected to transmit the power. The gear train in turn is determined by the positions of the various clutch sleeves which in turn is controlled by positioning the clutch forks or arms 48 and 62. For descriptive purposes, I have assigned the lower case letters *a* through *x* to indicate the twenty-four available table speeds. In Figure 1, various letters appear on opposite sides of each clutch fork indicating the position of the related forks for a given speed. If a given letter does not appear relative to a given fork the absence indicates said fork is in the neutral position for that speed.

It should be understood that in the operation of the transmission system as outlined above, the clutch sleeves 28 and 52 and particularly the female teeth on the inside diameter of said sleeves may not be properly aligned with the associated male teeth so as to permit immediate engagement of said sleeves upon movement of the sleeves by the clutch forks. However, inasmuch as a positive full moving mechanical linkage is connected to the outboard ends of said clutch forks, some method must be available to accommodate full movement of said forks and to maintain vertical pressure on the sleeves so that the engagement between the sleeve and the associated male gear will occur immediately upon a small relative rotative movement between the sleeve and the engaged male gear, said movement serving to align the tooth forms. This may be accomplished by a clutch or shifter fork assembly illustrated in detail in Figures 2 to 4.

Clutch fork

The clutch or shifter fork consists of spaced arms 71, 71 which are formed to embrace the related sleeve here shown in phantom at 73. Each arm 71 pivotally carries on the extremity thereof the lug 75 which is slidably received within a complementary slot formed on the periphery of the associated sleeve. As the fork is pivoted, pressure is exerted on the sleeve through said lugs. The arms 71, 71 may be and preferably are cast integrally with a body 77 which presents a bore 79, which in turn affords means to pivot or fulcrum the fork to a machine frame by means of the rod 81 journalled therein. Lock collars 83 accurately position and maintain the fork on said rod. A resilient actuating assembly 85 is mounted on the body on the side opposite the arms 71, 71. Said assembly 85 comprises an arm or lever 87 rigidly connected to a plate 89 which in turn is limitedly pivoted to a surface 90 of the body 77 by means of a pin 92. The clearance between the plate 89 and the surface 90 accommodates said limited pivotal movement before the plate 89 contacts the surface 90. A plurality of holes 93, preferably four, are formed in the plate 89 and are disposed on opposite sides of the pin 92. Bolts 94 having heads 96, body portions 98 and threaded end portions 99 are disposed within the holes 93 and threadably positioned in the body 77, as at 100. Each bolt has a coiled spring 102 sleeved over the body portion 98 and confined between two washers 104 and 106, one of which is seated against the bolt head 96 and the other being seated on the plate 89. A spacer 108 is also sleeved over each body portion 98 and abuts at opposite ends the washer 106 and the body surface 90.

In the operation of the shifter fork assembly, the lever 87 is moved vertically whereby the arms 71 move about the rod 81. When the carried sleeve 73 contacts the related male clutch without engaging therewith due to misalignment of tooth forms, motion of arms 71 stops but the lever 87 continues to move in the actuating direction pivoting about the pin 92. This motion of the actuating lever compresses the springs 102 on one side of the pin 92. As relative rotation between the sleeve 73 and the related male clutch cause the teeth to align, the compressed springs 102 urge the arms 71, 71 to realign with the lever 87 thus urging the carried sleeve into engagement with the related clutch.

Shifter selector device

Attention is now directed to Figures 5 through 9 which illustrate the construction and operation of the clutch fork selector device 109. Said device comprises a shifter bar 110 which is reciprocal horizontally, that is, from left to right, as seen in Figures 5 through 9. Spaced retaining ways 112, 112 are mounted on the shifter bar and serve to maintain the operating mechanism 114 on the bar for a limited horizontal movement relative to the bar. A cam hold 116 is formed within the bar 110 and another and slightly smaller cam hole 118 is formed within a plate 117 of the mechanism 114. It will be noted that a knob end 121 of the shifter lever 120 extends through the cam hole 116 and is positioned in the cam hole 118. For purposes of clarity, the levers 120 normally disposed perpendicular to and behind the shifter bars 110 have been rotated into the plane of Figures 5 through 9 and are fragmentarily shown at the right side of said figures. Said levers 120 are fulcrummed or pivoted to the frame at 122, thus occupying a fixed position during the action of the selector device 109. A recess is formed at 124 in the plate 117 and at one side of the hole 118. Pivotally mounted to the plate 117 by a pin 125 in the recess 124 is the substantially triangular shaped tumbler 126, an apex of said tumbler extending into the hole 118. A base of said triangular tumbler is positioned adjacent a guide block 128 which is mounted on plate 117 and limits the recess 124. Tumbler actuating pins or rods 130, 130 are slidably mounted in the block 128 and extend from both sides thereof. The inboard ends of the rods 130, 130 abut the base of the tumbler on opposite sides of the pivot pin 125. A cam 132, here shown diagrammatically, is positioned outboardly of the mechanism 114 and is engageable with the rods 130, 130. It will be noted that the cam 132 occupies a relatively fixed horizontal position during the horizontal movement of the selector device 109 but is movable vertically to optionally engage one or both of said pins. A ratchet unit 136 comprising a plurality of teeth 138 formed on the base of the tumbler 126 and a spring loaded tongue 139 is mounted in the block 128 and engageable with said teeth thereby serving to lock the tumbler in a given position and prevent accidental pivotal movement thereof.

Operation of the selector device 109 finds the bar 110 being moved to the right, as seen in Figures 5 through 9. After a short movement of the bar 110 relative to the mechanism 114, a stop 140 contacts an edge of the mechanism 114 and upon further movement of the bar 110, both the bar and the mechanism are carried to the right as a unit. The end 121 of the lever 120, because it is relatively fixed takes up a position at the left end of the cam hole 118. As the mechanism 114 is moved to the right, at least one of the rods 130 engages the cam 132 which occupies a preselected position. If, for example, the cam is in the position shown in Figure 6, the lower rod 130 contacts same and urges the tumbler 126 to pivot clockwise and causes the ratchet unit 136 to lock the tumbler in this pivoted position. With the tumbler thus pivoted, a cam slot with a downwardly extending leg 142 is formed in the hole 118 by the tumbler 126. It will be noted that at this time the associated lever 120 is in the neutral position. As the shifter bar 110 reaches its maximum position to the right, its movement is reversed, whereupon the end 121 of the lever 120 is guided into the downward leg of the cam slot resulting in the pivoting of said lever about its fulcrum 122, as is shown clearly in Figures 6, 7 and 8. It will be noted that one corner of the triangular tumbler 126 engages a notch 144 in the lower way 112, whereby the mechanism 114 moves leftwardly as a unit with the bar 110.

Repositioning of the cam 132 so it would be engaged by the upper pin 130 during the above described action would obviously cause the cam slot to be formed with an upwardly extending leg and the lever 120 would consequently be pivoted in the opposite direction. Figure 9 illustrates this result. When the cam is positioned centrally so that both of the pins 130 are engaged thereby, the tumbler takes up a central or neutral position in the hole 118 and the lever 120 would positively be held in its neutral position. When the tumbler 126 is thus positioned centrally, it restricts movement of the mechanism 114 and since neither corner of the tumbler 126 has engaged notch 144, the bar 110 is allowed to complete its full travel while the lever 120 is maintained by the mechanism 114 in neutral position. This result is illustrated in Figure 5.

Shifter operating panel

Attention is now directed to Figures 10 and 11, wherein is illustrated a shifter operating panel employed in my invention. The panel, indicated generally at 150, comprises a frame 152 rigidly secured to the machine (not shown). The shifter bar 110 referred to above is positioned immediately behind the frame 152 and is guidably movable horizontally relative thereto. The bar 110 comprises upper and lower legs 154 and 156, respectively, said legs being interconnected adjacent their right hand extremities by the recess defining web 158. A plurality of operating mechanisms or position selector devices, generally indicated at 114, are mounted on the bar 110, the upper leg 154 supporting two of said devices while the lower leg 156 supports three. It will be noted that the devices 114 are fragmentarily shown in Figure 10, that is, a detailed construction of the mechanism 114 being omitted. The ends of the associated levers 120 are shown by the knob ends 121 at the respective devices 114. It will be understood therefore that each device 114 has associated therewith a lever 120 and that each lever 120 has an end operatively associated with the related device 114 and has another end that is mechanically connected (not shown) to one of the related clutch forks of the clutch assemblies described in connection with Figure 1. Thus it will be seen that operation of each device 114 controls the operation of an associated clutch assembly. The upper and lower devices 114, shown to the right in Figure 10, control, respectively, the upper and lower clutch assemblies on the associated transmission shaft A. The upper and lower devices 114 positioned centrally in Figure 10 control, respectively, the upper and lower clutch assemblies on shaft C. The device 114 positioned to the left in Figure 10 controls the clutch assembly on the associated transmission shaft D.

Positioned on the frame 152 adjacent each device 114 are the respective rotatable cams 160, 162, 164, 166 and 168. The arrows at the respective cams indicate the normal direction of rotation of said cams. Each cam form is designed to engage one or both of the rods or pins 130, 130 on the related device 114 as the devices are carried to the right by the bar 110, the particular engagement depending upon the particular rotative position of the related cam. It is believed this action will be readily apparent to those skilled in the art, especially in connection with the heretofore given explanation of the operation of the individual devices 114. Cam sprockets 170, 172, 174, 176 and 178 are rigidly connected to the above mentioned cams and are shown in phantom at said respective cams.

Attention is now directed to the cam control unit 180 shown at the right of Figure 10 and in end elevation in Figure 11. The unit 180 comprises a mounting plate 182 securely fastened to the frame 152 and having a centrally located bore 184 which offers bushed reception for the rotatable shaft 186. Below the plate 182, as seen in Figure 10, the shaft 186 carries a drive plate 188 retained on the end of said shaft by the collar 190. The drive plate 188 is normally rotatable in clockwise direction with the shaft 186, the movement of the latter being controlled by an operating unit, as hereinafter described. Upstanding from the surfaces of the drive plate 188 is a fixedly positioned drive pin 192, the pin being carried by the rotating plate in a circular arc about the center of the shaft 186. Adjacent the drive plate and located with its center aligned longitudinally of the panel 150 and spaced from the rotating center of the drive plate 188 is the radially slotted driven plate 194. Another bore 196 is presented by the mounting plate 182 for the bushed reception of a shaft 198, said shaft being connected to and offering a rotative axis for the driven plate 194.

As noted, the drive plate 194 is radially slotted and, in the preferred embodiment, said slots are quadrantally disposed on said plate as at 200. Referring to Figure 11, it will also be seen that the drive plate 188 and driven plate 194 rotate in immediate adjacent planes, whereby pin 192 on the drive plate 188 will be complementally received by the slots 200 of the driven plate 194. It will thus be apparent to those skilled in the art, that a single revolution of the drive plate 188 will cause the driven plate 194 to rotate one-quarter of a revolution. It should be noted however, that the driven plate remains stationary during the initial 270° of rotation of the drive plate, the drive plate engaging the driven plate only during the final 90° of its rotation whereby four revolutions of the drive plate will produce four intermittent movements of the driven plate, which in total amount to one complete revolution.

Still referring to the control assembly 180, it will be seen that the shafts 186 and 198 have, respectively, fixed thereto, sprockets 202 and 204 for rotation therewith. A plurality of idler sprockets are mounted for rotational movement on the panel 150, the idler sprocket 206 being operatively associated with the drive plate 188 and the sprockets 208 being operatively associated with the driven plate 194.

A roller chain 210 interconnects the sprocket 202 from the drive plate and the sprockets associated with the cams 160 and 162. It will be noted that the idler sprocket 206 is slot mounted on the plate 182 whereby its center of rotation may be moved to maintain proper tension in the chain 210.

Another roller chain 212 operatively interconnects the sprocket 204 of the driven plate 194 with the sprockets 174, 176 and 178, which are respectively connected to the cams 164, 166 and 168. The idler sprockets 208, associated with the chain 212, serve to position the chain in order to afford a clearance for other operating panel parts, or, as in the case of the idler sprocket 208 which is slot mounted as at 214, to maintain the chain 212 under proper tension.

It will thus be understood that rotation of the drive plate 188 and associated sprocket 202 urges the cams 170 and 172 to rotate at a fixed ratio relative to the drive plate and that rotation of said driven plate 194 and its associated sprockets causes the cams 164, 166 and 168 to also rotate at a fixed ratio. As will be well understood by those in the art, the amount of relative rotation between the various cams and drive plate is simply a matter of relative gear ratios between the several sprockets. Suffice it to say that upon operation or selection of a given speed, as hereinafter explained, the various cams will be positioned so that the proper cam surface will engage the pins 130 of each associated device 109. In this connection, various combinations of the letters "a" through "x" indicating the corresponding machine speeds identical with those used in Figure 1, and the word "neutral" are shown in Figure 10 adjacent the particular cam surface utilized when a particular speed is selected. When a particular letter corresponding to a given machine speed does not appear relative to a given cam, it indicates that for that speed said cam presents a "neutral" surface.

Referring again to the operation of the drive plate 188 and driven plate 194, it will be remembered that the drive plate completes one full revolution for each one-quarter revolution of the driven plate. The result is that for each one-quarter revolution of the driven plate 194, a given setting for cams 164, 166 and 168 is produced. Each setting of these cams accommodates four distinct machine speeds which are selected by operation of cams 160 and 162, which in turn are controlled by the rotation of the drive plate 188. Thus for a given setting of driven plate 194, the quadrantal position of the drive plate 188 determines the selection of any one of four distinct speeds. These quadrantal positions are indicated as first, second, third and fourth speed positions in Figure 10. The same speed sequence follows for each of six one-quarter revolutions of the driven plate 194.

Attention is now directed to Figures 12 and 13 which illustrate a structure whereby given machine speeds are selected by the machine operator. Figure 12 is a sectional view of the speed selector dial and associated assembly which may be positioned on the machine in any location convenient to the normal position of the machine operator. A section of the machine frame 220 offers journal mounting for a shaft 222 to one end of which is affixed a speed selector knob 224 externally of the machine. The other end of said shaft is coupled to a conventional Selsyn generator 226 as at 227. Intermediate the ends of the shaft 222 and a gear 228 is mounted, said gear engaging another gear 230, which in turn is affixed to another shaft 232 journalled in the frame above the first mentioned shaft 222. Mounted on the end of the shaft 232 and on the external side of the frame 220 is an incrementally divided speed selector dial 234. Thus to select a given machine speed, the operator merely turns the knob 224 until the desired speed appears on the selector dial. As is well understood by those skilled in the art, rotation of the shaft 222 causes electrical impulses to be generated by a Selsyn generator 226, to which said shaft is coupled.

Figure 13 fragmentarily illustrates a portion of the machine preferably at its rear end adjacent the transmission system. The mentioned electrical impulses energize a Selsyn motor 236 which causes rotation of a shaft 186, said rotation corresponding or proportional to the rotation of the shaft 222. It will be noted that the shaft 186 is coupled to the motor 236 at 238. Drive plate 188 and driven plate 194 are fragmentarily shown in Figure 13 to illustrate the operative relation between the drive plate, the shaft 186 and the Selsyn motor. Thus as the Selsyn motor causes rotation of shaft 186 in response to impulses from the Selsyn generator, drive plate 118 is rotated and the cams of the shifter operating panel take up positions corresponding to the machine speed selected.

To accommodate speed selection in the event of Selsyn failure, a direct manual speed selector is provided adjacent the Selsyn motor and transmission system. Said selector comprises a gear 240 mounted on the shaft 186 intermediate the Selsyn motor 236 and the drive plate 188. The gear 240 is operatively engaged by another gear 242 which is affixed to one end of a shaft 244, said shaft having a selector handle and dial assembly 246 connected to its other and external end.

From the explanation thus far, it will be apparent to those skilled in the art that means must be afforded to induce the mentioned horizontal movement of the bar 110 of the shifter panel 150 and to coordinate this motion with the stopping of the rotation of the shafts A, B, C and D of the transmission system. To meet this functional requirement, a mechanical control assembly shown diagrammatically in Figure 14 is provided.

*Mechanical control assembly*

A hydraulic motor 250 provides the means to actuate the mechanical control assembly of Figure 14. Said motor comprises a cylinder 252 with a piston 254 reciprocally disposed therein and dividing said cylinder into advance and return chambers. A piston rod 256 is connected to said piston and extends from one side of the motor 250. Advance and return hydraulic lines 258 and 260 communicate with the advance and return chambers, respectively, and with a solenoid valve 262, said solenoid valve being the means whereby the hydraulic fluid is selectively directed to either the advance or return lines while the other line is opened to discharge through line 316. A metering valve 263 is positioned in the return line 260 and controls the return speed of the piston for smooth speed changing.

Hydraulic line 264 conveys hydraulic fluid from a source, for example, a motor driven pump (not shown) to the solenoid valve 262 and to another solenoid valve 266. Valve 266 controls hydraulic flow through a line 268 to a hydraulic motor 270 which in turn is operative to release a lock lever 272, that is, to move the lock lever to a position shown by the dotted line. Electrical control of the solenoid valve 266 is such that the release of the lock lever 272 occurs concurrently with the directing of hydraulic fluid to the advance chamber of the motor 250 by the solenoid valve 262 during the speed changing operation.

The control assembly also comprises three distinct horizontally movable bars 274, 276 and 278. Upper bar 274 is connected directly via the link 280 to the clutch-brake operating arm 12, hereinbefore referred to in connection with Figure 1. Thus as the bar 274 moves horizontally, the arm 12 is moved from its illustrated clutch engaged position through the neutral position to the brake engaged position. Reversal of the bar, of course, reverses this action. The intermediate bar 276 is connected to the piston rod 256 and is actuable by the motor 250. The lower bar 278 is mechanically connected via the link 282 to the aforementioned shifter bar 110 of the operating panel 150. Thus motion of the bar 278 causes motion of the shifter bar 110, whereby the operating panel 150 functions as above described.

It will be noted that the bar 276 pivotally mounts a gear 284, which in turn engages racks 286 and 288, respectively, on the bars 274 and 278. Thus in operation, the solenoid valves 262 and 266 direct hydraulic fluid to the motors 250 and 270, the motor 250 initiating movement of the bar 276 to the right, and the motor 270 accomplishing the release of the lock lever 272 against the action of the return spring 290. At this point, a spring loaded ratchet lock 292 is engaged with a notch in the bar 278 holding said bar in fixed position. The fixing of bar 278 causes the gear 284 to roll on rack 288 and consequently urge the bar 274 to the right at twice the speed of the bar 276. This causes the brake 8 to become engaged, whereupon the rotation of shaft 16 (Figure 1) is stopped with consequent halting of the entire transmission system. It will be noted that full stroke of the bar 274 occurs when the bar 276 has reached only the half point in its stroke to the right. Upon reaching full stroke position, bar 274 stops and continued motion of bar 276 causes pressure to be exerted through the gear 284 to the bar 278, whereby said bar is urged to disengage the ratchet lock 292 and to move to the right. As bar 278 moves to the right, movement of the bar 110 of the panel 150 is initiated, but this occurs only after the transmission system has been brought to a halt. Again the bar 278 moves to the right at twice the rate that bar 276 moves, thus bars 276 and 278 reach the extreme right position at the same instant.

It will be noted that the motion of bar 110 to the right brings the clutch arms 48 and 62 (Figure 1) to the neutral position, and the tumblers 126 of the selector devices 109 on the panel 150 are positioned by the pins 130 for the selected speed change.

Attention is now directed to a latch 296 (Figure 14) which is pivoted to the bar 276, as at 298. A spring loaded tongue mechanism 300 is mounted on the bar 278 and is engageable with the latch 296 whereby the latch is urged upwardly so that the shoulder 302 may be positioned behind a lug 304 on bar 274. In the return position of the bars 274, 276 and 278, illustrated in Figure 14, a trip pin 306, which is stationary or fixed relative to the machine and not connected to bar 276, will engage the cam surface 308 of the latch 296, whereby the latch is pivoted out of engagement with the lug 304 and thus permitting the above mentioned initial movement of the bar 274. As the bar 276 moves to the right, the latch 296 is disengaged from the pin 306 and also from the tongue mechanism 300. As the bars 276 and 278 reach extreme right or full advance position, the tongue mechanism 300 again engages the latch and urges the latch upwardly to lock the shoulder 302 behind the lug 304 of bar 274. It will also be noted that in this advance position, the shoulder 310 (Figure 15) of bar 276 abuts the end 312 of bar 278. This full advance position with the bars 274, 276 and 278 interlocked is shown in Figure 15.

When the control assembly of Figure 14 reaches the full advance position with the bars interlocked, as noted above, the shifter bar 110 engages and opens a return switch 314. Opening of switch 314 causes, through electrical relays, the return of solenoid valves at 262 and 266 to their original positions. Valve 262 now directs pressure fluid to the return line 260 and opens the advance line to discharge through line 316. Valve 266 opens the line 268 to discharge through line 318. The motor 250, being energized on the return stroke, returns as a unit the interlocked bars 274, 276 and 278 to the full left or full return position and the spring 290 returns the lever 272 to the locking position behind bar 278. As the interlocked bars return, the arm 12 is carried from the brake position to the neutral position at center stroke and to the clutch engaged position as said arm 12 is moved over center. The movement of the interlocked bars also carries with it the shifter bar 110 and the levers 120 associated with the respective devices 114 are consequently pivoted into the selected positions as was shown and explained relative to Figures 5 to 9. Thus it will be readily understood that the main clutch and transmission clutches engage almost concurrently.

*Transmission clutch lag*

Directing attention to Figures 6 and 7, it will be noted that the shifter bar 110 has a short distance of free movement relative to the mechanism 114. The letter F in Figure 6 indicates this free movement, the extent of the movement being limited by the tumbler 126 as it locks in position by engaging the edge 145 (Figure 7) of the notch 144. This small free movement of the bar 110 permits the engagement of the main clutch 8 slightly before the transmission clutches are urged into engagement by the motion of the ends 121 of the levers 120 into the cam slots formed in devices 114. This action ensures slight rotation of the gears for easy engagement of the transmission clutches 28 and 52.

As the return stroke is completed, the latch 296 (Figure 14) strikes the trip pin 306 and is moved to the disengaged position shown in Figure 14. Completion of the stroke also causes the pump to build up pressure in the hydraulic lines, said pressure operating a pressure switch 320 in line 264 which causes the pump (not shown) to cease to operate. It is desirable, when a speed change is being accomplished, or when the transmission is moved to neutral position for free table rotation, that the gear clutches in the table drive be prevented from pulling out of mesh until the table has stopped rotating. The primary reason for this is that if the transmission gear shafts are not stopped, or their speed reduced nearly to zero on the disengaging portion of a gear shift, then gear noise and possibly damage will occur on the engaging portion of the gear shift when the gears attempt to mesh.

Prior art boring mills generally have utilized a timing device to prevent premature actuation of the shifting mechanism, with the obvious disadvantage that the timing device must be set for the longest possible speed change cycle, which occurs when a high speed of table rotation is utilized. With the timer thus set and a speed change is to be made when the table is rotating at a very low speed, the table would be stopped in a very short interval of time. However, the gear shift still could not be made until the timing device had timed out.

In the present invention, the disadvantages of utilizing a timer are obviated by the utilization of a switch responsive only to rate of table rotation. The switch is generally designated at 510 in Figure 1 and is shown in detail in Figure 24. The switch contains a rotatable element which is operatively coupled to shaft 78 for rotation therewith. It will be understood that shaft 78 rotates whenever the table is rotating and at a speed proportional to the speed of rotation of the table.

Referring to Figure 24, it is seen that the switch 510 comprises a housing 512 adapted to be mounted on the transmission housing. Coupled to the shaft 78 and rotatable therewith is an aluminum disc 514. An aluminum cover 516 is secured to the housing 512 in a conventional manner, and is provided with a pair of blind openings 518 and 520, the latter being arranged to receive a magnet 522. The housing 512 is filled with oil and a freely rotatable disc 524 is mounted over the disc 514 and separated therefrom by a film of oil. The disc 524 carries for rotation therewith a pair of magnets 528 and 530 which, in one position of the disc 524, are aligned in an axial direction with openings 518 and 520 respectively. Stops 532 depend from cover 516.

If the shaft 78 has just started to rotate, the disc 514 sets up a force through the oil film urging disc 524 to rotate. When the force becomes great enough to overcome the attractive force between magnets 522 and 530, the disc 524 rotates until magnet 528 strikes one of the stops 532. When magnet 528, which had been aligned with a soft iron pad 534, moves out of alignment therewith, the pad, which is mounted on switch actuating arm 536, is moved upwardly by spring means (not shown) to open contacts ZS (Figs. 16 and 23) of a switch 537 which is secured to a bracket 538. The bracket 538, in turn, is mounted on the cover 516 by means of cap screws (not shown).

Disc 524 remains in the rotated position, even though the table, and consequently shaft 78, decelerates, until the shaft and disc 514 approach zero speed. At this time, disc 514 no longer exerts a force on disc 524 and the attractive force between magnets 522 and 530 is sufficient to move disc 524 to a position wherein magnet 528 is aligned with the pad 534. The pad is thereby pulled downwardly and the contacts ZS are closed. The function of contacts ZS will be described hereinafter in conjunction with the description of the electrical circuit.

*Electrical circuit*

Attention is now directed to Figure 16 which illustrates diagrammatically the electrical circuit utilized in the embodiment of Figures 1–14. Power for the circuit consists of a conventional three phase supply and a transformer 322 carrying current to a main control circuit. Table drive motor 324 and the pump motor 326 (heretofore not shown) are connected directly to the supply. The Selsyn motor-generator unit is also connected to the supply through a transformer 328.

Selector switch SW–1 is first placed in the run position. Starting switch SW–2 is then momentarily depressed creating a circuit through M1 which in turn closes normally open switch M1–1, thereby creating a holding circuit through M1. M1 also closes normally open switches M1–2, whereupon the table drive motor 324 is started. If all clutches have been engaged when the machine previously had been stopped, the table would now begin to rotate.

Proceeding normally, however, the desired speed is then selected, as above described. Speed push button 330 may be momentarily depressed. M2 is then energized through the normally closed pressure switch 320. M2 closes normally open switch M2–1 holding the circuit through M2. M2 also closes normally open switches M2–2, thereby starting the pump motor 326. Depression of the push button 330 also energizes the relay CR1, which in turn holds the circuit therethrough by closing CR1a. Energizing relay CR1 also closes normally open switches CR1b and CR1c. Closing contacts CR1c completes a circuit to energize solenoid 262 causing bars 274 and 276 (Figure 14) to be moved to the right as described heretofore. The clutch-brake unit is thereby moved from clutch-engaged to brake-engaged position whereby the table is decelerated. However, bar 278 is prevented from moving to the right by lock lever 272 until energization of solenoid 266. When the table reaches zero speed or a predetermined speed approaching zero, contacts ZS of centrifugal switch 510 are closed in the manner described heretofore, to complete a circuit to energize solenoid 266 whereby hydraulic motor 270 is actuated to release lock lever 272. The transmission now completes the speed change stroke as described heretofore and completion of the stroke opens switch 314, whereby CR1 is deenergized and solenoids 262 and 266 are returned to their original position. Thus the return stroke is initiated. Upon completion of the return stroke, pressure build-up, as noted above, opens pressure switch 320, deenergizing M2, whereby the pump motor 326 is stopped.

To disengage the table and enable same to be rotated freely by hand, a coast push button 332 is provided. Depression of button 332 energizes M2 starting the pump motor. The momentary depression also energizes CR2, which in turn closes normally open CR2a which holds the circuit through CR2. CR2 also closes normally open switches CR2c and CR2b. Closing switch CR2c completes a circuit to energize solenoid 262. Once again, bar 274 and 276 move to the right to engage the brake and decelerate the table. At or near zero speed of the table, the contacts ZS are closed by means of centrifugal switch 510 to complete a circuit to energize solenoid 266. The transmission now completes the stroke to neutral position. However, relay CR2 is unaffected by the return switch 314 and for this reason, the return stroke is not initiated. Upon completion of the advance stroke, hydraulic pressure is again built up in the advance hydraulic line, whereby pressure switch 320 is opened, M2 is deenergized and the pump motor is stopped with the control assembly in the advanced position. In the advance position, all clutches except the main clutch are in neutral position, the brake 8 being engaged to halt rotation of the transmission system. The table now may be freely rotated by hand.

To reengage the table drive, a coast release push button 334 is provided. Depression of 334 opens the circuit through CR2 thus dropping CR2a, CR2b and CR2c out of their circuits whereby the solenoids 262 and 266 are returned to their original position. M2 is also energized and the pump motor is started with the consequent return of the control assembly of Figure 14, as described above.

Table stop may be accomplished by depression of the table stop push button 336. Button 336 energizes M2 and starts the pump motor 326. CR3 is also energized which closes normally open holding switch CR3a and normally open switch CR3b, which energizes solenoid 262. Solenoid 262 initiates the advance stroke of the control assembly of Figure 14, whereby bars 274 and 276 are moved to the right. Because solenoid 266 is not energized, the lock lever 272 stays in the bar locking position thus holding bar 278 in the return position. Thus bar 274 is moved completely to the right engaging the main brake, bar 276 is moved to the half stroke position and bar 278 is maintained in the return position. At this point pressure builds up in the hydraulic lines, switch 320 is opened and M2 is deenergized, whereby the pump motor is stopped. The main brake halts the table and the entire transmission system with all clutches of said transmission system is still engaged.

To start the table, push button 338 is depressed, deenergizing CR3 and dropping CR3a and CR3b out of the circuit. Solenoid 262 is returned to its original position and the control assembly is urged to the return position.

The selector switch SW-1 may be set for the "jog" position. A jogging push button 340 is provided and is operative to produce table rotation upon depression thereof. In the normal position of button 340, M2 is energized and the pump motor 326 is started. CR3 is also energized which closes CR3b, whereby solenoid 262 is energized. This causes the transmission system to be stopped in the same manner as depression of the button 336, described above, that is, with the control assembly half way to the right. In this position, the main brake has stopped the table and all gears of the transmission system are still engaged. Depression of the button 340 drops out CR3 and CR3b, whereby solenoid 262 is returned to its original position. Thus the bar 274 of Figure 14 is returned at the left and the main clutch is engaged, whereby the table is caused to rotate. It will be noted and understood that the table rotates only when the button 340 is depressed. A main or emergency stop switch 341 is provided in the table drive circuit to stop table rotation in the event of an emergency. Also overload circuit breakers are provided at 339 and 343.

Manual speed change

In the event of hydraulic or electrical failure, a manually operated device, shown diagrammatically in Figure 17, may be utilized to operate the control assembly of Figure 14. The device comprises a lever 342 pivotally connected to the bar 276, as at 344, as is shown in Figures 14 and 17. The lever 342 is fulcrummed to the frame as at 346. A manual operating lever 348 is positioned on the machine, preferably at the operator's station. The lever 348 has one end pivoted to the frame, as at 350 and is movable about said pivot through a segment of an arc. A direct mechanical connection ties the lower end 352 of lever 342 with a point 354 intermediate the ends of lever 348, said mechanical connection being herein illustrated by the rod 356. Thus, as the operating lever 348 is moved through the mentioned segment of the arc, the bar 276, and consequently the control assembly of Figure 14, is moved from the return to the advance position and vice versa. The positions of the lever 348, whereby the clutch and brake will be respectively engaged, are shown in Figure 17. To jog the table, it is only necessary to move the lever 348 back and forth between the clutch and brake engaged positions. During the jogging operation, a movable limiting stop 358 may be positioned in the path of the lever 348 to prevent accidental disengagement of the transmission clutches in a manner as will hereinafter be described.

To manually accomplish a speed change after the desired speed is selected, as above described, the stop 358 is moved away from position engagement with the lever 348. The lever 348 is then moved to the brake position, which stops the transmission system, and then it is moved through to complete the arc to the table free position. At this point, the control assembly of Figure 14 is moved to the right of the full advance position. The table may now be rotated by hand, if desired, as all transmission clutches are in the neutral position. The return stroke of the control assembly is completed, merely by moving the lever 348 back to the clutch engaged position.

It should be noted that to complete the manual speed change outlined immediately above, the lock lever 272 (Figure 14) must be manually locked out of engagement with the bar 278.

It will also be noted that the connection at 352 between the lower end of the lever 342 and the rod 356 comprises a slot in lever 342 with the rod 356 slidably disposed therein. A spring 360 surrounds the rod 356 abutting at its opposite ends the lever 342 and a collar 362 spaced from said lever. Another collar 364 prevents disengagement of the rod and lever. The purpose of this flexible connection is to prevent damage to the manual speed changing device of Figure 17 in the event that the stop 358 is left in lever engaging position during automatic operation of the speed changer. This is necessary as the lever 348 is moved through its operating arc when the speed change is automatically operated.

Describing the embodiment of Figures 17A–23, it will be understood that, except for the modifications hereinafter discussed, the device is identical with that of Figures 1–17 and parts corresponding to those of Figures 1–17 are identified by corresponding numerals.

Referring first to Figure 17A, it will be seen that immediate engagement of the transmission clutch teeth may be assured by the utilization of a pair of torque motors. The torque motors are shown at 400 and 401 in Figure 17A and are coupled to shafts D and B, respectively. The motors are energized only during transmission speed changes and their purpose is to apply a torque momentarily to shafts B and D and therethrough to shafts A and C, respectively. The applied torque induces slight rotation in the shafts thereby preventing associated teeth of the related gears and transmission clutches from positioning themselves teeth to teeth so that immediate meshing with a minimum of shock and noise is assured. The motors are deenergized immediately on completion of a speed change in a manner which will be described hereinafter in conjunction with the electrical diagram of Figure 23. It will be understood that the utilization of the torque motors obviates the need for the novel shifter fork of Figures 2 to 4 and instead a conventional type of shifter fork having a rigid connection between arms 70 and lever 86 may be used.

Figure 18 illustrates an alternate mechanical control assembly which replaces the control assembly of Figure 14 when the torque motors 400 and 401 (Figure 17) are utilized to ensure the rapid, proper engagement of the transmission clutches. Whereas in the embodiment of Figures 1–16 it was desirable to permit the main clutch to engage prior to the engagement of the transmission clutches so that the slight rotation of the gears would aid easy engagement of the transmission clutches, the optimum arrangement would be for the transmission clutches to engage prior to the main drive clutch. This arrangement would completely eliminate the danger of damaging the transmission clutches by the application of full power to the transmission system before the clutch teeth were fully engaged.

Referring to Figure 18, it should be understood that parts which are identical with parts shown in Figure 14 have been given like numerals and that the action of disengaging all clutches and engaging brake 8 is the same in the embodiments of both figures. The structural differences of Figure 18 are only effective on the return stroke of the control assembly and comprise generally a dash-pot assembly 402 and a safety cam assembly 404. The cam assembly comprises a safety stop 406 pivotally mounted on the bar 274 and free to pivot in a counterclockwise direction, as viewed in Figure 18, but restrained from pivoting in a clockwise direction by a shoulder 287. A safety cam 408 is pinned or keyed, as desired, to the shaft 409 which carries the gear 284 so that the cam 408 will rotate with the gear 284. The dash-pot assembly comprises a body 410 having a reservoir 412 and an open ended hydraulic cylinder bore 414. Secured to the end of the bar 274 for reciprocatory movement therewith is a piston rod 416 extending through the body 410 and into the bore 414 and provided with a smaller diameter portion 418. Movable in the bore and freely slidable on the portion 418 is a piston 420. A spring loaded one-way check valve arrangement 422 accommodates fluid flow from the bore 414 to the reservoir 412 through openings 425 and 423 and a similar one-way check valve arrangement 424 accommodates fluid flow from the reservoir 412 to the bore 414 through openings 423 and 421. It should be understood that the reservoir is always kept full inasmuch as it is positioned beneath the oil sprays of the lubricating system of the boring mill.

Describing now the return stroke of the device and assuming that the bar 110 is in the extreme advance position and has struck the switch 314 whereby the solenoid valves 262 and 266 were returned to their original positions, pressure fluid is now directed to the return chamber of motor 250, and the bars 274, 276 and 278 will be moved to the left as a unit as viewed in Figure 18. When approximately one-half of the return stroke has been completed, the end portion 426 of the rod 416 strikes piston 420 and must, as a consequence, move with the piston against the resistance of the fluid in the bore 414 and the spring of check valve 422. The bar 274 will now begin to lag behind the bars 276 and 278. The relative motion between bars 274 and 276 causes the gear 284 to rotate in a clockwise direction because of its meshing with the rack teeth 286 and as a consequence bar 278 will be advanced at a more rapid rate, whereby the transmission clutches will be engaged before the bar 274 moves a sufficient amount to shift the fork 12 to engage the main drive clutch. If for some unforseen reason the bar 278 does not return quickly enough relative to the bar 274, the cam 408 will strike the stop 406 causing the cam and with it the gear 284 to rotate in a clockwise direction whereby once again the bar 278 will be returned at a more rapid rate to ensure engagement of the transmission clutches before the main drive clutch engages. When the bar 278 has reached the end of its return stroke and the transmission clutches have been engaged, continued movement of bar 276 will, through the gear 284 and racks 286 and 288, move the bar 274 to the extreme left or return position as previously explained relative to Figure 14. Therefore, by means of the above described mechanism, the transmission clutches will always be engaged prior to engagement of the main drive clutch.

Preferred structure for the selection of machine speeds by the operator is illustrated in Figures 19 through 22. Figure 23 illustrates the alternate electrical wiring diagram incorporating the control means to operate the preferred structure which results in greater accuracy in the positioning of the cams 160, 162, 164, 166 and 168 and which also provides positive locating in the selected position of the mechanism. The preferred embodiment comprises generally a 24 position rotary solenoid 494 and a master-slave selector system operative to control a mechanical transmission system utilizing a positive detent and slot arrangement to attain accurate selective positioning of the transmission.

As explained previously relative to Figures 10 and 11, the particular positioning of the shaft 186 determines the cam positions whereby the proper gear trains are set up through the associated clutches to transmit the selected speed to the table. The shaft 186 is shown also in Figure 20 and is coupled as at 428 to a shaft 430 journalled in the feed selector unit housing 431. There are also mounted in the selector unit a plurality of shafts designated 432, 434 and 436. A gear 438, mounted for rotation with shaft 430, meshes with a gear 440 keyed to shaft 432. Gear 440 in turn meshes with a gear 442 keyed to shaft 434. Keyed to shaft 436 is a gear 444 which is driven by a pilot motor 445 (Figure 23) which is coupled as at 446 to the shaft 436.

The gear 440 is provided with an enlarged portion 448 having four slots 450 (Figure 19) equally spaced on the periphery thereof and selectively engageable by a detent 452 forming a part of a lever 454 pivotally mounted on shaft 434. The long arm of the lever 454 extends through a yoke 456 by means of which the lever may be pivoted to move the detent out of engagement with one of the slots 450. The yoke 456 is secured to a two piece draw bar 458 for movement therewith and the draw bar is secured at one end thereof to a solenoid 460 which when energized will move in a direction to disengage the detent. When the solenoid 460 is deenergized the draw bar and yoke are urged to the right, as viewed in Figures 19 and 22, by means of a spring 462 thereby moving the long arm of the lever and the detent to the right whereby the detent will engage the particular slot which is aligned therewith at that time. One end of the spring 462 seats against a projection 463 in the housing 431 and the opposite end seats against a sleeve 465 which is held in place by a nut 467 threaded onto the end of the draw bar 458. Mounted on the short arm of the lever 454 is an idler gear 464 (Figure 19) which is rotatably carried by a stud shaft 466 which is preferably pinned as at 468 to the lever. The lever is also provided adjacent the idler gear 464 with an abutment 470 which is engageable with the actuating pin 472 of a limit switch 474.

From the description given thus far it may be seen that energization of solenoid 460 will cause the lever 454 to be pivoted in a clockwise direction so that the idler gear 464 will be brought into operable engagement with the gear 444 at which time a gear train will be set up through gears 444 and 464, and through gears 442, 440 and 438 successively whereby shaft 430 and shaft 186 will be rotated as described heretofore to shift the cams.

Preferably formed integrally with shaft 432 for rotation with gear 440 is a pinion 476 in meshed engagement with a gear 478 (Figure 19) rotatably journaled in the housing 431 and in turn meshing with a control gear 480 keyed to a slip ring shaft 482 for rotation therewith. The ratio between pinion 476 and the gear 480 is six to one so that if gear 480 should rotate for example $\frac{1}{24}$ of a revolution the pinion would rotate $\frac{1}{4}$ of a revolution.

The shaft 482 carries for rotation therewith a slip ring assembly 484 (Figure 21) comprising a body 486 provided with a peripheral ring 488 which is connected in a conventional manner to a source of electrical current. Connection is made through a lead 490 to a continuous ring 492 on the face of the body 486 opposite the ring 488. Mounted adjacent the slip ring assembly is a twenty-four position rotary solenoid 494 which is movable by means of the dependent slave unit 495 of a conventional master-slave system, the master or control portion 499 (Figure 23) of which is operable by a manual speed selector dial 497 (Figure 23) at the pendant station of the machine. Keyed to the projecting end of the solenoid shaft for rotation therewith is an arm 496 (Figure 21) carrying double contacts 498 and 500. The contact 498 rides on the ring 492 while the contact 500 rides over a collector ring 502 carried by the body 486. The collector ring 502 is continuous, except for a small insulated segment represented by the numeral 504, and is electrically connected to the solenoid 460.

The operation of the device may best be explained in conjunction with the electrical wiring diagram of Figure 23. When it is desired to change the speed of the table the operator turns the dial 497 on the selector unit at the pendant station to the desired speed position. The amount of rotation of the dial will be in increments of $\frac{1}{24}$ of a revolution inasmuch as there are twenty-four available speeds and twenty-four corresponding positions on the dial. The rotary solenoid 494 together with the arm 496 will follow and move a corresponding part of a revolution. Movement of the rotary solenoid shaft and arm 496 moves the contact 500 off the insulated segment 504 and into contact with and around the collector ring 502 completing a circuit to energize a relay CR4 which in turn closes contacts CR4a and CR4b. The closing of contacts CR4a completes a circuit to energize solenoid 460. As explained before, energization of the solenoid 460 pivots the lever 454 to bring the gear 464 into mesh with the gear 444 and also closes the contacts of the normally open limit switch 474 to thereby energize the speed selection pilot motor 445 (Figure 23) which rotates shaft 436. Pivoting of the lever 454 also pulls the detent 452 from the slot of the gear 440 with which it was engaged. The pilot motor rotates and the rotational motion is transmitted through the gear train to shaft 186. The motion is also transmitted from the pinion 476 through idler 478 and gear 480 to the shaft 482 and slip ring assembly 484. The slip ring assembly 484 will continue to rotate until the insulated segment 504 once again is positioned under the contact 500. Relay 494 will be deenergized at this time and in turn the detent solenoid 460 will be deenergized and lever 454 will be rotated in a counterclockwise direction by means of the spring 462. It will be recalled that the ratio between the gear 480 and the pinion 432 is six to one so that if, for example, the dial selector and consequently the rotary solenoid were rotated four positions from the starting point, the four positions representing $4/24$ or $1/6$ of a revolution, the gear 480 would have to rotate $1/6$ of a revolution to bring the insulated segment 504 under the contact 500. The pinion 432, and with it the gear 440 would simultaneously rotate six times that amount or one full revolution. From this it may be seen that no matter how many increments of movement are imparted to the rotary solenoid there will always be a slot 450 in position to be engaged by the detent 452 when the collector ring 502 is rotated a sufficient amount to present the insulated segment to the contact 500.

Returning the lever 454 to its original position will also open the contacts of the limit switch 474 thereby cutting off power to the speed selection pilot motor 445 causing the motor to stop.

A direction limit switch LS7 is utilized to select the shortest path of travel for the pilot motor and therefor the shortest time to reposition the transmission gears. The position of the limit switch LS7, and associated contacts, is determined by the direction of rotation of the manually operated twenty-four position dial in the pendant station acting through a conventional reversing starter generally indicated at 506, whereby either contacts LS7a or LS7b will be closed thereby closing either contacts MC or MCC. It will be understood that a circuit through LS7a will cause the motor to rotate in one direction whereas a circuit through LS7b will cause the motor to rotate in the opposite direction.

Referring to the torque motors which were explained relative to Figure 17A, the motor 400 is shown also in Figure 23, it being understood that the operation of motor 401 would be accomplished in the same manner. To energize the motor 400, a pair of limit switches LS1 and LS2 are provided and are positioned in any convenient position for actuation by the bar 274 (Figure 18). The switch LS1 is positioned to be closed during a speed change immediately before the gears and clutches start to go into mesh. Closing the contacts of LS1 completes a circuit through M3 thereby starting the motor whereby a torque will be applied to the related shafts as previously described. At the completion of the return stroke of bar 274, and with the gears completely in mesh, the contacts of LS2 are opened thereby breaking the circuit and stopping the motor.

An additional safety device is provided whereby a speed change stroke may be automatically repeated if for any reason, the transmission gears do not mesh at the end of the first speed change stroke. This safety device constitutes an automatic reshift arrangement comprising a time delay relay TDR (Figure 23), and a switch 314a in series with switches LS-1 and LS-2. The relay TDR includes contacts TDR-1 which are in series with switch 314 and relay CR1. Switch 314a is arranged to be open when the transmission is in neutral position and arranged to be closed by bar 110, in the same manner as switch 314, when a speed change stroke has been initiated.

As described heretofore, the switch LS-1 is closed just prior to meshing of the gears to energize coil M3 and thereby start the torque motors 400 and 401. Closing switch LS-1 also completes a circuit to energize the coil of relay TDR. If the gears mesh properly, switch LS-2 is opened and the circuit to relay TDR broken as a consequence.

If, however, the gears do not mesh properly within a predetermined time interval which has been set up in the relay TDR, contacts TDR-1 are closed. Closing contacts TDR-1 completes a circuit through these contacts, through switch 314 and relay CR1. Energizing relay CR1 causes shifter bar 110 to move on advance stroke as described heretofore to neutral position. When the shifter bar 110 and associated mechanism reach neutral position, the switches 314 and 314a are opened whereby relays CR1 and TDR are deenergized. Deenergizing relay CR1 causes the mechanism to move on return stroke toward engaged position as described heretofore. The reshifting operation automatically repeats until proper meshing of the gears occurs.

It should be understood that the modified selector system may be utilized, if desired, with the device of Figures 1 through 11 and 14.

I claim:

1. In a metal cutting machine wherein relative motion between a tool and an engaged work piece causes the tool to form the work piece, the combination of a transmission system operable to impart said motion and including a power source, a plurality of transmission shafts, an operative clutch assembly interconnecting the shafts with the source whereby energy of said source may be selectively transmitted or not transmitted to said shafts, a plurality of interengaging gears on said shafts, a plurality of clutches operatively associated with at least certain of said shafts, clutch forks operative to selectively engage said clutches whereby a gear train is selected to transmit said energy through said system, a panel to control operation of said forks comprising a reciprocal shifter bar, a plurality of selector devices on said shifter bar, each of said devices comprising a cam hole, a tumbler pivoted within the cam hole to form optionally variable cam slots, cam means operatively associated with the tumbler and operative to position said tumbler to form a given slot in response to reciprocation of said shifter bar, shifter levers having ends disposed within said cam holes of the respective devices whereby said levers may be urged to changed position as the shifter bar reciprocates, mechanical means interconnecting each shifter lever and a related clutch fork, whereby said fork urges the associated clutch to engage certain of said gears in response to and dependent upon the change of position of said shifter lever, and a control assembly operative to cause said bar to reciprocate.

2. In a metal cutting machine as described in claim 1, wherein the control assembly comprises three reciprocal bars, a gear mounted on one of said bars, racks fixed to the other of said bars and engaged with said gear, a connection between one of the other of said bars and said shifter bar, another connection between the other of said bars and the clutch assembly, a movable lever connected to said one bar operative to reciprocate same in response to movement of said lever, and means yieldable to a predetermined pressure operative to maintain said bar having the connection to the shifter bar in a fixed position until said pressure is attained.

3. A turning and boring machine having a rotatable table, a power source, a gear transmission system interconnecting the table and the source whereby said table is urged to rotate, a plurality of clutches associated with said system whereby the gear ratio of said system may be varied with resulting variation in the speed of table rotation, an operating panel including a frame and a shifter bar movable relative thereto to advance and return positions, a plurality of cams rotatably mounted on the frame, means for controlling the rotation of said cams responsive to a manually operated table speed selector, a plurality of selector devices mounted on said shifter bar respectively adjacent said cams and respectively and operatively connected to said clutches, selectable surfaces on said cams engageable with said devices in response to movement of said shifter bar whereby said devices operate said clutches, the particular operation of said clutches being dependent upon the particular selectable surfaces presented by said rotatable cams, a control assembly having a connection to the shifter bar operative to move said bar to advance and return positions, and means on said assembly to halt rotation of said table before said shifter bar is moved.

4. In a machine operative to form a work piece wherein said forming is completed by relative movement between a work piece and a tool, the combination of a power source, a geared transmission system connected to the source and operative to cause said relative movement, a plurality of operative clutches associated with said system whereby the gear ratio of said system may be varied with resulting variation of the speed of said relative movement, means to control the operation of said clutches including an operating panel, clutch control mechanisms mounted on said panel and comprising cam holes, tumblers in said holes optionally and selectively forming various cam slots, means to control the formation of said cam slots, a clutch shifter lever in each of said cam holes, and means to guide each lever within a formed cam slot thereby causing operation of said clutches.

5. In a turning and boring machine having a rotatable table, a power source, a shaft operatively connected to said source for constant rotation, another shaft, a clutch and brake assembly interconnecting said shafts, lever means operative to engage the clutch whereby the other shaft is caused to rotate, said lever means also being optionally operative to engage said brake whereby rotation of the other shaft is halted, a transmission system comprising a plurality of transmission shafts, one of which is in geared engagement with the other shaft and one of which is in geared connection to the table, a plurality of gears on each of said transmission shafts, certain of said gears being rotatable with the associated transmission shafts and certain other of said gears being freely rotatable about the associated transmission shafts, a plurality of positive tooth clutches on at least some of said transmission shafts, a clutch fork associated with each of said clutches operative to optionally move said clutch into and out of engagement with the related gears or position said clutch in neutral position relative to the related gears, an operating panel to control operation of said clutch forks, said panel comprising a fixed frame, rotatable cams mounted on the frame, a rotatable drive plate, a rotatable driven plate, means to intermittently connect the drive plate with the driven plate whereby a predetermined number of revolutions of said drive plate produces a predetermined number of revolutions of the driven plate, connection means between the drive plate and some of said cams, other connection means between the driven plate and the other of said cams whereby said cams are caused to rotate in a fixed relation to the connected drive and driven plates, respectively, a plurality of clutch control devices each disposed to be engageable with one of said cams, said cams causing a particular operation of said devices depending upon the rotative position of said cams, each of said devices comprising a lever connected to a related clutch fork at one end and fixedly pivoted intermediate its ends, a cam hole movably receiving the other end of said lever, a tumbler movably positioned in said cam hole and operative to alternatively form with the cam hole any one of a plurality of cam slots, and means to move said control devices into and out of engagement with the related cams, whereby each tumbler is urged to form a preselected cam slot and the related lever is guidably moved in said preselected slot to a position whereby the connected clutch fork moves the related clutch into engagement with certain of the related gears or positions said clutch in neutral relative to said gears, the positions of the various clutches determining a particular train of gears through the transmission system whereby a given table rotation speed is produced.

6. A turning and boring machine according to claim 5, wherein the means to move said devices comprises a control assembly having a movable bar, power means connected to and operative to move said bar, and means connecting said bar to said lever means and to said devices, whereby said lever means is urged to engage said brake before said devices are urged to move.

7. A turning and boring machine according to claim 5, and including a manually operated table speed selector having a connection to said rotatable drive plate whereby the rotation of said drive plate and the resulting position of said cams is controlled.

8. In a turning and boring machine having a rotatable table, a gear transmission system connected thereto, and a power source connected to the system whereby rotation of said table is produced, the combination of means associated with said system whereby the input-output ratio of said system is varied to produce varied table rotative speeds, selective means to control said means comprising at least one shifter lever member connected to said means, said lever member being movable to operate said means, a mechanical member for moving said lever comprising a cam hole receiving an end of said lever member, a tumbler positioned in said hole and movable therewithin to optionally form any one of a plurality of cam slots, and control means to move one of said members relative to the other of said members whereby the tumbler is moved to form one of said cam slots and said lever member is guidably moved within said slot to operate said means.

9. In a control assembly utilized in connection with a speed selector for a machine of the type described, a main bar, auxiliary bars on opposite sides of the main bar, said bars being movable to advance and return positions, a gear rotatably mounted on the main bar, racks mounted on the auxiliary bars and engageable with said gear, one of said auxiliary bars having a connection to a related shifter mechanism, the other of said auxiliary bars having a connection to a related clutch brake operating lever, power means connected to the main bar operative to move said bars to the advance position, means to restrict movement of said one auxiliary bar until the other auxiliary bar has reached advanced position, and means on said main bar to engage said auxiliary bars in the advance position thereof, whereby said power means returns said bars to the return position concurrently and as a unit.

10. A control assembly according to claim 9, wherein said power means comprises a hydraulic cylinder having a piston dividing same into advance and return chambers, said piston being connected to the main bar, advance and return hydraulic lines communicating respectively with the advance and return chambers, a solenoid control valve operative to selectively direct hydraulic fluid to the advance and return lines, and a metering valve in the return line operative to control the flow of hydraulic fluid to said return chamber.

11. In a control assembly utilized in connection with a speed selector for a machine of the type described, a main bar, auxiliary bars, said bars being movable to advance and return positions, one of said auxiliary bars having a connection to a related shifter mechanism, the other of said auxiliary bars having a connection to a related clutch brake operating lever whereby the brake is operated upon advance of said bar, power means connected to said main bar operative to move same to advanced and returned positions, and gear means interconnecting the bars whereby the other of said bars is moved to the advance position before said main bar and said one auxiliary bar.

12. In a selector device utilized to position a shifter lever in a machine of the type described, a movable bar, spaced ways mounted on the bar, a plate defining a cam hole therein mounted on said ways and movable relative to said bar, a pivotal tumbler of substantially triangular form positioned with an apex in said hole, said tumbler being operative to limit relative movement between said plate and said bar in one direction, a stop operative to limit relative movement between said plate and said bar in the opposite direction, pins engageable with a base of said tumbler opposite said apex, adjustable cam means engageable with said pins in response to movement of said bar, whereby the tumbler is urged to pivot and define with said hole a cam slot, ratchet means engageable with said tumbler to maintain said tumbler in said pivoted position, and an end of said shifter lever disposed in said hole and guidable within said slot in response to movement of said bar.

13. A selector device utilized to position a shifter lever in a machine of the type described, said device comprising: a tumbler movably positioned within a cam hole, means to selectively move said tumbler within said hole to one of a plurality of positions, the tumbler in the hole forming in each of said positions a distinct cam slot, an end of said shifter lever disposed in said hole, said device being movable relative to said lever whereby said end is guidably moved within the formed cam slot.

14. In combination, a transmission system having a plurality of gears, clutch means operative to engage and disengage certain of said gears, whereby the ratio of said system may be changed, means to selectively control the operation of said clutch means including a panel, selector devices associated with said panel, said devices having levers conected to said clutch means, and mechanisms to control the movement of said levers, said mechanisms comprising slots to guidably change the position of said levers, the form of said slots being optionally variable, and controllable cam means operative to vary the form of said slots.

15. In a metal cutting machine, the combination of a rotatable work suporting table, a transmission system operable to rotate said table, said system comprising a plurality of transmission shafts, a plurality of selectively engageable gears on said shafts, a plurality of movable clutches on at least one of said shafts, said clutches being operable to selectively engage said gears in any one of a plurality of trains, and means to ensure positive engagement of said clutches and said gears, said last mentioned means comprising a motor independent of the main drive motor and coupled to at least one of said shafts to impart a momentary torque to said shafts during the engagement of said gears.

16. In a control assembly utilized in connection with a speed selector for a machine of the type described, a main bar, two auxiliary bars, said bars being movable to advance and return positions, one of said auxiliary bars having a connection to a related shifter mechanism, the other of said auxiliary bars having connection to a related clutch-brake operating lever whereby the brake is operated upon advance of said bars and the clutch is engaged on the return of said bar, power means connected to said main bar operative to move same to advance and return positions, gear means interconnecting the bars whereby the other of said auxiliary bars is moved to the advance position before said main bar and said one auxiliary bar, and means to delay the return movement of said other auxiliary bar to ensure actuation of said shifter mechanism prior to engagement of said clutch.

17. A control assembly according to claim 16, wherein said last mentioned means comprises a dash-pot housing having a fluid reservoir and a cylinder chamber therein communicating with the reservoir, a piston rod secured to said other auxiliary bar for movement therewith, said rod extending into said chamber, a piston in said chamber, said piston being mounted on said rod for axial sliding movement therealong for a portion of the return stroke of said other auxiliary bar, said piston being movable with said rod for the remainder of the return stroke of said other auxiliary bar.

18. In a metal cutting machine having a work supporting table selectively rotatable at any of a plurality of speeds, a power source, a transmission system operatively connecting said source to the table, a selector shaft, control means responsive to the position of said selector shaft to vary the gear train through said transmission system to the table, and selector means operative to selectively position said shaft, said selector means comprising a motor having an output shaft, a drive gear secured thereto for rotation therewith, a selector gear train to drive said selector shaft, one gear of said train having a plurality of equally spaced slots on the periphery thereof, a pivotal lever having a detent thereon selectively engageable with said slots when in a first position, a gear carried by said lever in operative engagement with said gear train, and means to pivot said lever to a second position to disengage said detent from the engaged slot to simultaneously move said one gear into engagement with said drive gear, then to accommodate rotation of said shaft to a predetermined position, and then to return said lever to said first position.

19. In a device according to claim 18, wherein said selecting means comprises a manually rotatable speed selecting dial, a rotatable electrical contact ring having an insulated segment thereon, said ring being operably connected to said slotted gear whereby rotation of said slotted gear will impart proportional rotation to said ring, contact means rotatable in response to rotation of said dial to thereby complete a circuit through said ring to said motor to drive said gear train.

20. In a preselective speed changer for changing the rotatable speed of a work rotator in a machine having a tool to engage said work; the combination of a motor for rotating said rotator, a main drive shaft, a clutch for releasably connecting the shaft to the motor, a plurality of transmission shafts, gear means on said transmission shafts for connecting said rotator to said main drive shaft, a plurality of clutch means for interconnecting said gear means in various gear trains to afford various driving ratios between said main shaft and said rotator, actuating means for respective clutch means, said actuating means being adjustable to various positions corresponding to respective trains, means for so adjusting said actuating means while the rotator is rotated by the main drive shaft through one of said trains, and control means comprising means for disengaging said clutch, and then engaging the clutch means with the actuating means, and then re-engaging the clutch.

21. A clutch shifter fork utilized in a machine of the type described for moving a related clutch sleeve into engagement with an associated gear, the combination of a body, pivot means on said body to pivotally attach said fork to a related frame, spaced arms connected to one side of said body, means on the ends of said arms remote from said body to connect said arms to the related clutch sleeve, a surface on the body on the side thereof opposite said arms, a compensating assembly connected to said surface for limited pivotal movement relative thereto, said assembly comprising a plate having holes therethrough disposed on opposite sides of the connection between the assembly and said surface, a lever extending from said plate and falling substantially within a plane common to the arms, bolts positioned loosely within the holes and anchored to the body, spring means surrounding each bolt and reacting between the bolt and said plate whereby upon movement of said lever to a position angular with respect to said plane certain of said springs are compressed and thereby exert a pressure to realign the lever and said arms in said common plane.

22. In an operating panel utilized to position a plurality of speed change shifter levers in a machine of the type described, a frame, a plurality of rotatable cams mounted on said frame, a rotatable drive plate, a rotatable driven plate, a mechanical connection between the drive plate and some of said cams, another mechanical connection between the driven plate and the other of said cams, means connecting said plates whereby said plates and cams rotate at a fixed ratio to each other, a plurality of selector devices, each associated with one of said cams and comprising cam slots of optionally variable form, ends of said shifter levers positioned in said slots, and means operative to bring the devices into engagement with the related cams, whereby the form of said slots may be changed, said means also being operative to disengage the devices from the cams and to guide said bar ends within said formed slots.

23. In a machine tool the combination of a rotatable work support, power means for rotating said support, transmission means interconnecting the power means and the work support and adapted to be selectively actuated to provide a plurality of support speeds, means for selectively actuating said transmission means, said actuating means being presettable while the support is rotating, and control means for stopping the work support, then rendering effective said actuating means and then starting the work support.

24. In a metal cutting machine the combination of: a rotatable work supporting table; a transmission operable for rotating said table; means for shifting said transmission to provide a plurality of gear trains therethrough; and means responsive to incomplete shifting of said transmission for automatically reshifting the latter.

25. In a metal cutting machine the combination of: a rotatable work supporting table; a transmission operable for rotating said table; means for shifting said transmission to provide a plurality of gear trains therethrough; and means responsive to incomplete shifting of said transmission for automatically reshifting the latter, said responsive means comprising electrical timing means for reactuating said shifting means after a preset time interval, and contact means responsive to completion of a transmission shift for deenergizing said timing means.

26. In a metal cutting machine the combination of: a rotatable work supporting table; a transmission operable to rotate said table; means for shifting said transmission to selectively provide a plurality of gear trains therethrough; and means responsive to rate of table rotation for preventing shifting of said transmission until the table decelerates to a predetermined low speed.

27. In a metal cutting machine the combination of: a rotatable work supporting table; a transmission operable to rotate said table; means for shifting said transmission to selectively provide a plurality of gear trains therethrough, said transmission comprises a shaft rotatable in unison with said table, a centrifugal switch operatively connected to said shaft and having an element rotatable therewith, and means responsive to rate of rotation of said shaft and said element for preventing actuation of said shifting means until the table decelerates to a predetermined low speed.

References Cited in the file of this patent

UNITED STATES PATENTS

| | | |
|---|---|---|
| 731,087 | Tucker | June 16, 1903 |
| 2,384,448 | Banker | Sept. 11, 1945 |
| 2,469,881 | Laubach et al. | May 10, 1949 |
| 2,755,679 | Nallinger | July 24, 1956 |

UNITED STATES PATENT OFFICE
CERTIFICATE OF CORRECTION

Patent No. 2,885,899                                              May 12, 1959

Theodore Foster

It is hereby certified that error appears in the printed specification of the above numbered patent requiring correction and that the said Letters Patent should read as corrected below.

Column 8, line 27, after the numeral "222" strike out "and"; line 50, for "plate 118" read -- plate 188 --; column 9, line 34, for "aforementionad" read -- aforementioned --; column 10, line 51, for "clutch 8" read -- clutch 6 --; column 11, lines 14, 15, 20, 32 and 46, for "shaft 78", in each instance, read -- shaft B --; column 13, line 26, for "returned at" read -- returned to --; column 21, line 36, for "conected" read -- connected --.

Signed and sealed this 10th day of November 1959.

(SEAL)
Attest:

KARL H. AXLINE                                               ROBERT C. WATSON
Attesting Officer                                          Commissioner of Patents